(12) United States Patent
Thirumalai

(10) Patent No.: US 12,283,071 B2
(45) Date of Patent: Apr. 22, 2025

(54) SYSTEMS AND METHODS FOR SCALABLE THROUGHPUT ENTROPY CODERS

(71) Applicant: Samsung Display Co., Ltd., Yongin-si (KR)

(72) Inventor: Vijayaraghavan Thirumalai, Fremont, CA (US)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/336,877

(22) Filed: Jun. 16, 2023

(65) Prior Publication Data

US 2023/0326087 A1    Oct. 12, 2023

Related U.S. Application Data

(63) Continuation of application No. 17/901,348, filed on Sep. 1, 2022, now Pat. No. 11,715,239, which is a continuation of application No. 16/835,092, filed on Mar. 30, 2020, now Pat. No. 11,468,601.

(60) Provisional application No. 62/960,517, filed on Jan. 13, 2020.

(51) Int. Cl.
*G06T 9/00* (2006.01)

(52) U.S. Cl.
CPC ........................................ *G06T 9/00* (2013.01)

(58) Field of Classification Search
CPC ....................................................... G06T 9/00
See application file for complete search history.

(56) References Cited

U.S. PATENT DOCUMENTS

| | | |
|---|---|---|
| 5,471,206 A | 11/1995 | Allen et al. |
| 8,885,706 B2 | 11/2014 | Bankoski et al. |
| 9,191,670 B2 | 11/2015 | Karczewicz et al. |
| 9,473,169 B2 | 10/2016 | Marpe et al. |
| 9,571,858 B2 | 2/2017 | Gu et al. |
| 9,743,116 B2 | 8/2017 | Kim et al. |
| 2011/0001643 A1 | 1/2011 | Sze et al. |

(Continued)

OTHER PUBLICATIONS

Jacobson et al., A New Display Stream Compression Standard under Development in BVESA, SPIE Optical Engineering + Application, 2017 (Year: 2017).*

(Continued)

*Primary Examiner* — Wednel Cadeau
(74) *Attorney, Agent, or Firm* — Lewis Roca Rothgerber Christie LLP

(57) ABSTRACT

A method for decoding image content from an encoded bitstream including a plurality of blocks includes: dividing a block including one or more components of the image content into N single samples and M sample groups corresponding to one of the components, where N and M are greater than or equal to one; decoding each of the N single samples using a symbol variable length code to generate one or more decoded single samples; decoding each of the M sample groups using a common prefix entropy code to generate one or more decoded sample groups, each of the M sample groups including a variable length prefix and one or more fixed length suffixes representing a plurality of samples; concatenating the decoded single samples and the decoded sample groups into a block of residuals; and reconstructing image content based on previously reconstructed neighboring blocks and the block of residuals.

20 Claims, 12 Drawing Sheets

(56) References Cited

U.S. PATENT DOCUMENTS

2017/0250709 A1     8/2017  George et al.
2018/0343471 A1*   11/2018  Jacobson ............. H04N 19/152
2019/0082181 A1     3/2019  Sze et al.

OTHER PUBLICATIONS

VESA, VDC-M Standard VESA Display Compression-M (VDC-M) Standard, May 2018, Retrieve from the internet Aug. 12 2021 (Year: 2018).*

Jacobson, Natan, et al. "A new display stream compression standard under development in VESA." *Applications of Digital Image Processing XL.* vol. 10396. International Society for Optics and Photonics, 2017, 12 pages.

Vesa: "VDC-M Standard VESA Display Compression-M (VDC-M) Standard," May 2018, 173 pages, retrieved from the Internet: URL:https://vesa.org/vesa-standards/ [retrieved on Oct. 24, 2018).

EPO Extended European Search Report dated Jun. 11, 2021, issued in corresponding European Patent Application No. 2115329.7 (8 pages).

VESA, VDC-M Standard VESA Display Compression-M (VDC-M) Standard, May 2018, Retrieved from the internet Aug. 12, 2021 (Year: 2021).

* cited by examiner

SYSTEMS AND METHODS FOR SCALABLE THROUGHPUT ENTROPY CODERS

CROSS-REFERENCE TO RELATED APPLICATIONS

The present application is a continuation of U.S. patent application Ser. No. 17/901,348, filed on Sep. 1, 2022, which is a continuation of U.S. patent application Ser. No. 16/835,092, filed Mar. 30, 2020, which claims priority to and the benefit of U.S. Provisional Patent Application No. 62/960,517, filed in the United States Patent and Trademark Office on Jan. 13, 2020, the entire disclosure of each of which is incorporated by reference herein.

FIELD

Aspects of embodiments of the present disclosure relate to systems and methods for scalable throughput entropy coders.

BACKGROUND

Data compression relates to encoding information, where the encoded information uses fewer bits than the original representation of the information. Lossless data compression enables encoding by removing statistical redundancy in the original representation. Accordingly, in lossless data compression, no information is lost and the original representation of the information can be reconstructed by a decoder or decompressor. On the other hand, lossy data compression reduces the bits used by removing unnecessary or less important information. Therefore, in many circumstances, the original representation of the information cannot be perfectly reconstructed from the data that is compressed using a lossy compression algorithm.

Entropy coding (or entropy encoding) is a form of data compression in which the most probable symbols are encoded using fewer bits and the least probable symbols are encoded using more bits. In other words, in an entropy coding system, the number of bits used to represent a symbol may vary based on the probability that the symbol will appear in the original representation. Examples of entropy encoding include Huffman codes and Morse code (e.g., where a single bit is used to encode the most common letters in the English language, "E" and "T," and four bits are used to represent uncommon letters such as "Q" and "Z").

SUMMARY

Aspects of embodiments of the present disclosure relate to systems and methods for implementing scalable throughput entropy coders.

According to one embodiment of the present disclosure, a method for decoding image content from an encoded bitstream including a plurality of blocks includes: dividing, by a decoder circuit, a block including one or more components of the image content into N single samples and M sample groups corresponding to one of the one or more components, where N is greater than or equal to one and M is greater than or equal to one; decoding, by the decoder circuit, each of the N single samples using a symbol variable length code (SVLC) to generate one or more decoded single samples; decoding, by the decoder circuit, each of the M sample groups using a common prefix entropy code (CPEC) to generate one or more decoded sample groups, each of the M sample groups including a variable length prefix and one or more fixed length suffixes representing a plurality of samples; concatenating, by the decoder circuit, the decoded single samples and the decoded sample groups into a block of residuals; and reconstructing, by the decoder circuit, image content based on previously reconstructed neighboring blocks of the image content and the block of residuals.

N and M may be set in accordance with a target decoder throughput by: calculating an upper bound of M based on a number of samples of the block and a highest available throughput; calculating a number of variable length codes based on the number of samples of the block and the target decoder throughput; and calculating N based on the number of variable length codes and the upper bound of M.

Each of the M sample groups of the block may have a same number of fixed length suffixes. The block may be prediction coded in a transform skip, block prediction mode.

At least two of the M sample groups of the block may have different numbers of fixed length suffixes. The block may be prediction coded in a transform more or in a transform skip, block prediction mode.

The block may include a plurality of components of the image content, and the method may include, for each component of the plurality of components in the block: dividing each component of the block into N single samples and M sample groups; decoding each of the N single samples; decoding each of the M sample groups; concatenating the decoded single samples and the decoded sample groups; and reconstructing the image content of the component of the block.

The encoded bitstream may further include a component skip flag indicating that all of the plurality of samples of a corresponding component of the block of the encoded stream are zeroes.

The encoded bitstream may further include a group skip flag indicating that all of the samples of a group of the M sample groups are zeroes.

According to one embodiment of the present disclosure, a method for encoding image content includes: dividing, by an encoder circuit, received image content into one or more blocks, each of the one or more blocks including a plurality of samples from one or more components of the image content; prediction coding, by the encoder circuit, each block to generate blocks of residuals; partitioning, by the encoder circuit, each of the blocks of residuals into N single samples and M sample groups, where N is greater than or equal to one and M is greater than or equal to one; encoding, by the encoder circuit, each of the N single samples using a symbol variable length code (SVLC) to generate one or more SVLC encoded samples; encoding, by the encoder circuit, each of the M sample groups using a common prefix entropy code (CPEC) to generate one or more CPEC encoded samples, each of the M sample groups including a variable length prefix and one or more fixed length suffixes; and combining, by the encoder circuit, the SVLC encoded samples and the CPEC encoded samples to output an encoded bitstream.

N and M may be set in accordance with a target decoder throughput by: calculating an upper bound of M based on a number of samples per block of the one or more blocks and a highest available throughput; calculating a number of variable length codes based on the number of samples per block and the target decoder throughput; and calculating N based on the number of variable length codes and the upper bound of M.

The partitioning each of the prediction coded blocks may include dividing at least one prediction coded block of the prediction coded blocks using uniform partitioning, wherein each of the M sample groups of the at least one prediction coded block may have a same number of fixed length suffixes. The at least one prediction coded block may be prediction coded in a transform skip, block prediction mode.

The partitioning each of the prediction coded blocks may include dividing at least one prediction coded block of the prediction coded blocks using non-uniform partitioning, wherein at least two of the M sample groups of the at least one prediction coded block may have different numbers of fixed length suffixes. The at least one prediction coded block may be prediction coded in a transform mode or a transform skip, block prediction mode.

Each block may include a plurality of components of the image content, and the method may further include, for each component of the plurality of components: prediction coding each block; partitioning each block of residuals into N single samples and M sample groups; encoding each of the N single samples into SVLC encoded samples; encoding each of the M sample groups into CPEC encoded samples; and combining the SVLC encoded samples and the CPEC encoded samples.

The encoded bitstream may further include a component skip flag indicating that all of the plurality of samples of at least one corresponding channel of the block are zeroes.

The encoded bitstream may further include a group skip flag indicating that all of the samples of a group of the M sample groups are zeroes.

According to one embodiment of the present disclosure, a system for transferring image content includes: an encoder circuit configured to: divide received image content including a plurality of components into one or more blocks, each of the one or more blocks including a plurality of samples from one of the plurality of components; prediction code each block to generate prediction coded blocks; partition each of the prediction coded blocks into N single samples and M sample groups, where N is greater than or equal to one and M is greater than or equal to one; encode each of the N single samples using a symbol variable length code (SVLC) to generate SVLC encoded samples; encode each of the M sample groups using a common prefix entropy code (CPEC) to generate CPEC encoded samples, each of the M sample groups including a variable length prefix and one or more fixed length suffixes; and combine the SVLC encoded samples and the CPEC encoded samples to output an encoded bitstream; and a decoder circuit configured to: receive the encoded bitstream from the encoder circuit; divide a block of the encoded bitstream into the N single samples and the M sample groups; decode each of the N single samples using the SVLC to generate decoded single samples; decode each of the M sample groups using the CPEC to generate decoded sample groups; reconstruct the prediction coded block from the decoded single samples and the decoded sample groups; apply prediction coding to decode the prediction coded block; and decode the image content from the decoded prediction coded block.

N and M may be set in accordance with a target decoder throughput by: calculating an upper bound of M based on a number of samples of the block and a highest available throughput; calculating a number of variable length codes based on the number of samples of the block and the target decoder throughput; and calculating N based on the number of variable length codes and the upper bound of M.

The encoder circuit may be further configured to: detect one or more factors of a communication environment in which at least one of the encoder circuit or the decoder circuit is operating; and dynamically set the values of N and M based on the one or more factors.

The one or more factors may include one or more of: power, processor capabilities, number of decoders in the decoder circuit working in parallel, internal bandwidth, temperature conditions of the decoder circuit, or noise in a physical medium between the encoder circuit and the decoder circuit.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

Figure 1:
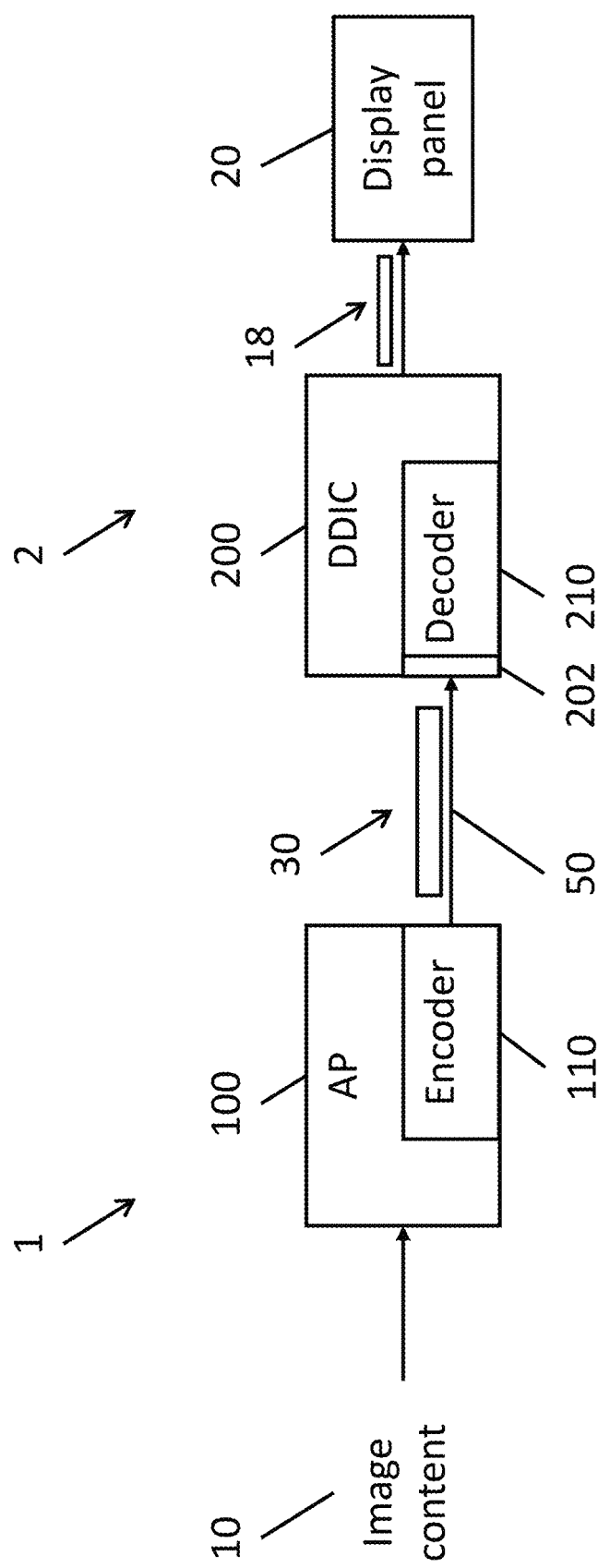
FIG. 1 is a block diagram of a system including an encoder and a decoder, where the encoder is configured to encode image content and the decoder is configured to decode the image content for display on a display device.

In the following detailed description, only certain exemplary embodiments of the present disclosure are shown and described, by way of illustration. As those skilled in the art would recognize, the disclosure may be embodied in many different forms and should not be construed as being limited to the embodiments explicitly set forth herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated.

Compression may be applied for data storage and data transfer in a wide range of contexts, such as data archival, and wired and wireless data communication over computer networks and over local connections. These local connections may include, for example, data transfers along a data bus within a computing device (e.g., a smartphone, a tablet computer, a laptop computer, and a desktop computer) and/or connections with external devices, such as over a wired connection such as a digital display interface (e.g., DisplayPort (DP) or Display Serial Interface (DSI)).

For the sake of convenience, embodiments of the present disclosure will be presented herein in the context of digital display data, more specifically displaying image content on a display panel of a display device. However, embodiments of the present disclosure are not limited thereto, and the principles described herein may be applied to provide scalable throughput entropy coders for other applications.

FIG. 1 is a block diagram of a system including an encoder and a decoder, where the encoder is configured to encode image content and the decoder is configured to decode the image content for display on a display device. As shown in FIG. 1, the image content 10 (e.g., a bitmap representation of a single image or a single frame or multiple frames of images) is supplied to an application processor (AP) 100 (e.g., a central processing unit (CPU), a field programmable gate array (FPGA), an application specific integrated circuit (ASIC), and/or a graphics processing unit (GPU) of a computing device) of a host 1, where the AP 100 may include an encoder 110. The encoder 110 is configured to encode the original representation of the image content 10 into an encoded (or compressed) bitstream 30. The encoded (or compressed) bitstream 30 may then be transferred over a wired or wireless connection. In embodiments discussed herein, a transfer over a wired connection is described, but the techniques described herein may also be applicable in implementations that involve transfer over a wireless connection. In the embodiment shown in FIG. 1, the encoded (or compressed) bitstream 30 may be transferred over a physical medium 50 (e.g., over a wire such as a data bus or a cable or other connector or over a wireless connection) to a display driver integrated circuit (DDIC) 200 of a display device 2 (e.g., an external monitor, a television, or an integrated display panel of a smartphone, tablet, or laptop computer). The DDIC includes a framebuffer 202 (or frame buffer, e.g., random access memory such as dynamic random access memory) for receiving and storing the encoded bitstream 30 as it arrives over the physical link and a decoder 210 configured to decode the encoded (or compressed) bitstream 30 from the framebuffer 202 into a decompressed representation 18. In the case of a lossless encoding, the decompressed representation 18 is the same (or substantially the same) as the original representation of the image content 10. In the case of lossy encoding, the decompressed representation 18 may be substantially similar (e.g., visually similar) to the original representation of the image content 10 such that the resulting data appears visually lossless. The DDIC may then control the display panel 20 to display the decoded representation 18 of the image content 10, such as by supplying driving waveforms to the display panel to control the luminance of individual pixels of the display panel in accordance with the decoded representation 18 of the image content 10.

The DDIC 200 may include, or may be connected to, components for demodulating the signal received over the physical medium 50 (e.g., to generate the digital representation of the bitstream from the voltages applied to the physical medium). Likewise, the AP 100 may include, or be connected to, components for modulating a signal, based on the encoded bitstream 30, to be applied the physical medium 50.

According to various embodiments of the present disclosure, the encoder and the decoder may be referred to an encoder circuit and a decoder circuit, respectively, and may be implemented using various types of processing circuits, as would be understood by one of skill in the art, and the encoder circuit may be implemented using a different type of processing circuit than the decoder circuit. These types of processing circuits may include, for example, a general purpose computer processing unit (CPU), a graphics processing unit (GPU), a digital signal processor (DSP), a field programmable gate array (FPGA), an application specific integrated circuit (ASIC), or combinations thereof (e.g., where different parts of the encoding or decoding process or pipeline are implemented using different types of processing circuits). In addition, as would be understood to one of skill in the art, the various processing circuits may be components of a same integrated circuit (e.g., as being components of a same system on a chip or SoC) or may be components of different integrated circuits that may be connected through pins and lines on a printed circuit board.

Generally, image data or image content is represented using a bitmap, where every location in the bitmap corresponds to an individual pixel. For the sake of clarity, the term pixel will be used herein to refer to a picture element having multiple components (or channels). For example, in the red-green-blue (RGB) color space, these components include a red component (or red channel), a green component (or green channel), and a blue component (or blue channel). As another example, in the YCbCr color space, these components may include a luma (Y) component, a chrominance blue (Cb) component, and a chrominance red (Cr) component. As another example, in the YCoCg color space, these components may include a luma (Y) component, a chrominance green (Cg) component, and a chrominance orange (Co) component. However, embodiments of the present disclosure are not limited thereto. The values at each location in the bitmap represent a level (e.g., gray level) of the components at that location. Accordingly, the image content or image data may be considered as representing the color and brightness at each location in the image.

Figure 2:
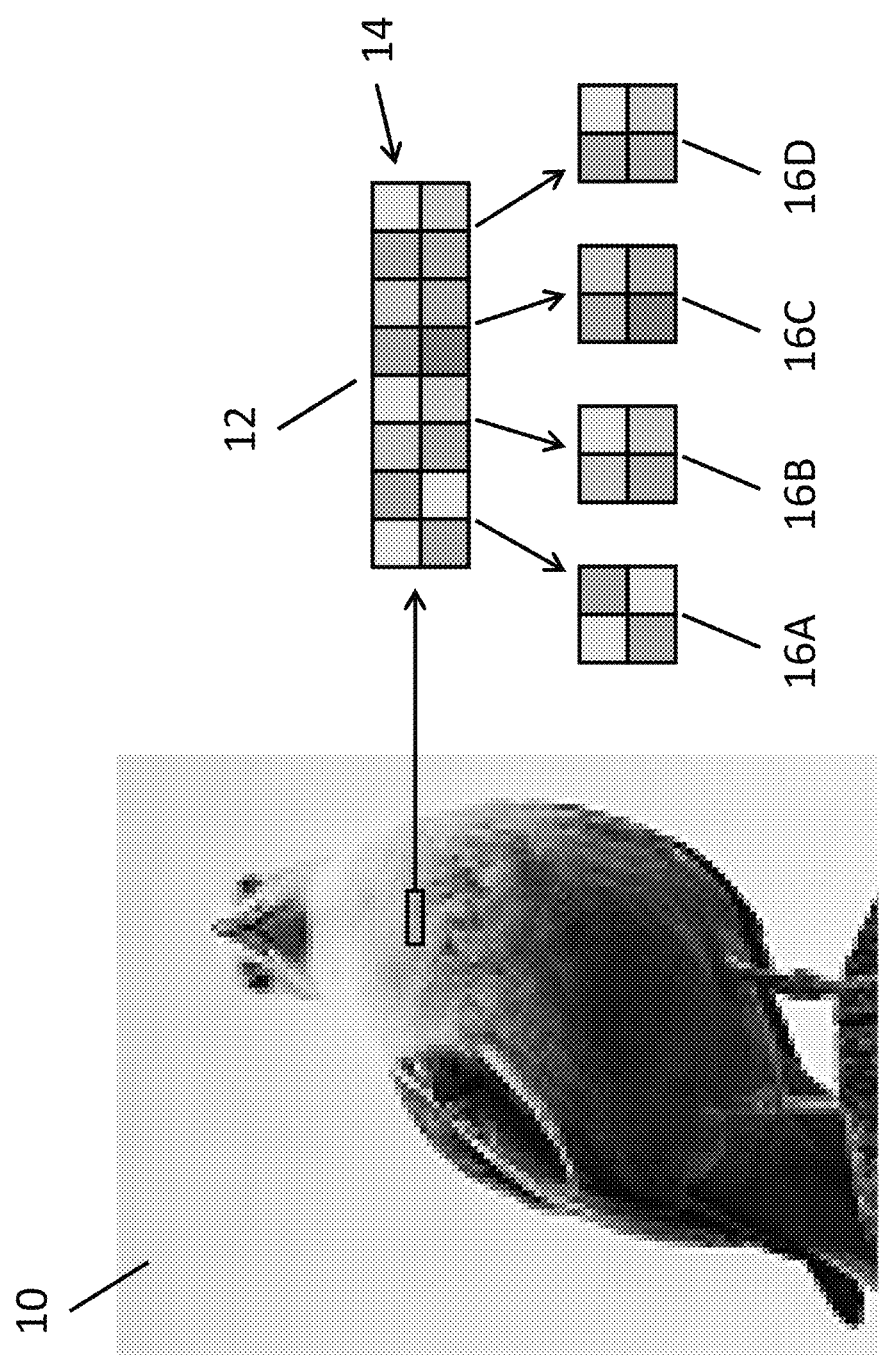
FIG. 2 is a schematic illustration of one block of an image, where the block has dimensions 8×2 (with sixteen samples) and is divided into four groups of four samples.

For the sake of the discussion herein, each channel of the image content 10 will be treated independently. As generally understood by those of skill in the art, the term "sample" refers to the digital value associated with one component of one pixel of the image content 10 (e.g., a "sample" may be a scalar value), the term "block" refers to a collection of samples (e.g., samples corresponding to a contiguous portion of the image content 10), and each block may be partitioned into one or more "groups" of samples. FIG. 2 is a schematic illustration of one block 12 of an image of a bird (image content 10), where the block 12 has dimensions 8×2 (sixteen samples 14) and is partitioned into four groups 16A, 16B, 16C, and 16D, each group having four samples.

Blocks may be coded using spatial prediction within the image content 10 (e.g., the values of samples may be encoded based on predictions made about their values from neighboring samples in the image, such as pixels above and to the left of the pixels in the image). Instead of using the original neighboring values, reconstructed values are used for prediction. The difference between the predicted value of a sample and the actual value of the sample is referred to as a quantized residual, and these quantized residuals may further be used to represent the samples in the encoded representation of the image content 10.

For each block, one of a plurality of different prediction coding modes may be used, where the particular prediction mode may be selected based on testing to determine which mode produces the least amount of distortion subject to rate control constraints or, in other words, subject to rate-distortion cost, where the rate relates to the amount of data required by the mode to encode the block, and the distortion refers to the loss in quality after encoding (e.g., the magnitude of the difference between the input block and the encoded block after it is decoded). These prediction coding modes may include: a "transform mode," which includes a transformation (e.g., to frequency domain) operation which may be better suited to natural content; and a "transform skip, block prediction mode," which skips (or excludes) a transformation and performs a block prediction operation, and which may be used for artificial or illustrated graphics content. For each block, there are multiple modes (or options) available for use in encoding the block, and the encoder may select the best mode (or option) for the block.

When operating in a transform mode, in some embodiments, the encoder tests a set of intra predictors for each block (denoted herein as X) to determine which intra predictor produces the smallest rate-distortion cost. The selected intra prediction mode is signaled explicitly in the bitstream, such that the decoder need only parse the information and perform a single decode operation. In cases where the block X is in the RGB color space, the data may be transformed into the YCoCg color space. In some cases, if the block X is in the YCbCr color space, then no color space transformation is applied and the process continues in YCbCr.

In some embodiments, the encoder computes an intra prediction block P for transform space from a given set of intra prediction modes. The output of the intra prediction is a residual block R, which is the difference between the block X and the intra predicted block P. In some embodiments, a discrete cosine transform (DCT) is then applied to the residual block R, resulting in a block of transform coefficients T. The transform coefficients T are then quantized to produce a quantized transform coefficient block QT. These quantized transform coefficients QT are the values that are transmitted in the bitstream, as embedded in entropy coding groups. An inverse quantization ($\hat{T}=Q^{-1}[QT]$) and inverse transformation ($\hat{R}=DCT^{-1}[\hat{T}]$) are applied such that the distortion can be computed between the residual block R and the reconstructed residual block $\hat{R}$. (The same inverse quantization and inverse transformation operations may be performed by the decoder.) The rate-disparity cost information for each mode is computed from the rate and distortion noted above.

When operating in a transform skip, block prediction (BP) mode, in some embodiments, the current block is spatially predicted from a set of reconstructed neighboring samples (the BP search range). Before prediction, the current block is partitioned into a set of sub-blocks (e.g., four 2×2 sub-blocks in the case of an 8×2 block.

According to one embodiment, each sub-block is predicted from the BP search range using either a 2×2 partition or a pair of 2×1 partitions. In the former case, the 2×2 sub-block is represented by a single block prediction vector (BPV) which will generate a 2×2 predicted block from the search range. In the case that a pair of 2×1 partitions is selected, the sub-block will be represented by two different BPVs. The first BPV will generate a 2×1 predicted block for the upper two samples in the sub-block, while the second BPV will generate a 2×1 predicted block for the lower two samples. The encoder performs a search to find the BPV which minimizes distortion for each 2×2 and 2×1 partition within the current block. The result of this is a set of BPVs and a predicted block P for both partition types. Next, the residual is computed as R=X−P. As there are two options for partition type, there will be two residual blocks computed; one associated with 2×2 partitions and one associated with 2×1 partitions. Both of the residual blocks may then be processed as follows (e.g., in parallel): first, forward quantization is performed on all residual samples, and the quantized residuals QR are used to compute the entropy coding cost of each 2×2 sub-block; second inverse quantization is performed to obtain the reconstructed residuals $\hat{R}$ from which the distortion of each sub-block can be computed. Finally, for each 2×2 sub-block, the encoder can select between 2×2 and 2×1 partitions based on the rate/distortion tradeoff. The syntax for BP mode includes the set of BPVs as well as entropy-coded quantized residuals for the three color components.

According to one embodiment, the decoder receives a BP encoded block, which includes quantized residuals, from the bitstream. In particular, the decoder applies an entropy decoder to decode the quantized residuals, while the BPV values and the partition structure are parsed directly. The BP search range is identical between the encoder and the decoder, because it includes of reconstructed samples, which are causally available. The partition structure and BPV are used to generate the predicted block P, while the quantized residuals are inverse quantized to obtain the reconstructed residuals $\hat{R}$. Finally, the predicted block P and the reconstructed residuals $\hat{R}$ are added together to generate the reconstructed block, which is subject to color space conversion if necessary. For RGB source content, BP is computed in the YCoCg color space. If the source content is YCbCr, then BP will be computed natively in YCbCr.

When operating in a transform mode, a transform, such as a discrete cosine transform (DCT), is further applied to the residuals, and the coefficients of the transform are represented as the values in the block. In other circumstances, such as a transform skip, block prediction mode, the transform is omitted and the residuals themselves are represented as the values in the block. In some circumstances, when using lossless compression, the transform mode may be omitted. In some circumstances, when applying lossy compression, the transform coefficients or the residuals (in the case of transform mode or transform skip mode, respectively) are quantized.

Figure 3:
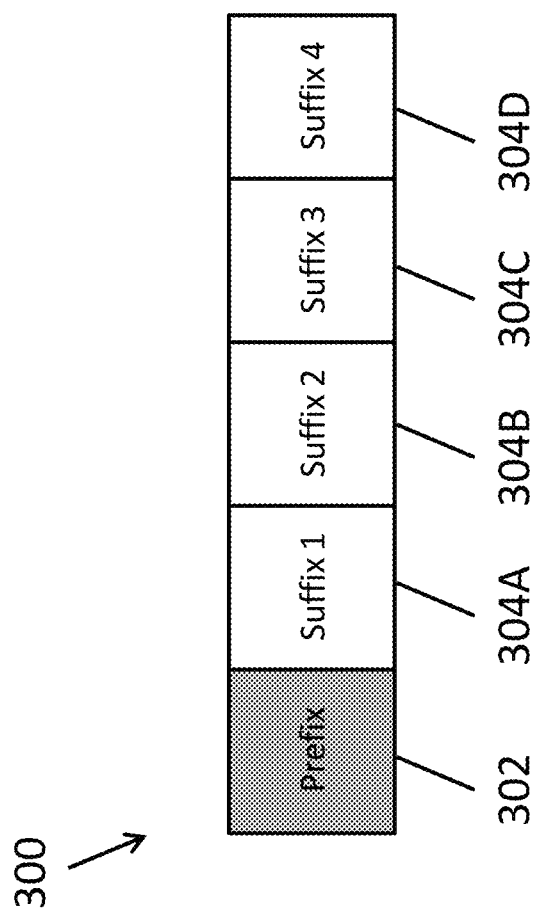
FIG. 3 is as schematic depiction of a common prefix entropy code (CPEC) structure for a group with N=4 samples.

Common prefix entropy code (CPEC) is one technique for entropy coding a group of N samples (e.g., the quantized residuals or quantized transform coefficients in the case of lossy compression), where a single prefix is used with N suffixes. In CPEC, the prefix is coded using a variable length code (e.g., a unary code) that represents the number of bits used to code each of the N suffixes. Each of the N suffixes is coded with the same number of bits (e.g., using a fixed length code). FIG. 3 is as schematic depiction of a CPEC structure for a group with N=4 samples. Therefore, as shown in FIG. 3, the CPEC structure 300 includes a prefix 302 and four suffixes 304A, 304B, 304C, and 304D.

An entropy decoder may take a full clock cycle to parse the prefix of a CPEC coded group because this prefix has variable length. However, once the prefix representing the number of bits in each of the suffixes is decoded, the N suffixes can be shifted into another buffer for parsing the individual samples without occupying additional time of the entropy decoder, and the entropy decoder can jump ahead in the framebuffer (e.g., by the decoded number of bits times N) to decode the next group.

Additional information regarding entropy coding can be found, for example, in Jacobson, Natan, et al. "A new display stream compression standard under development in VESA." *Applications of Digital Image Processing XL*. Vol. 10396. International Society for Optics and Photonics, 2017.

Figure 4:
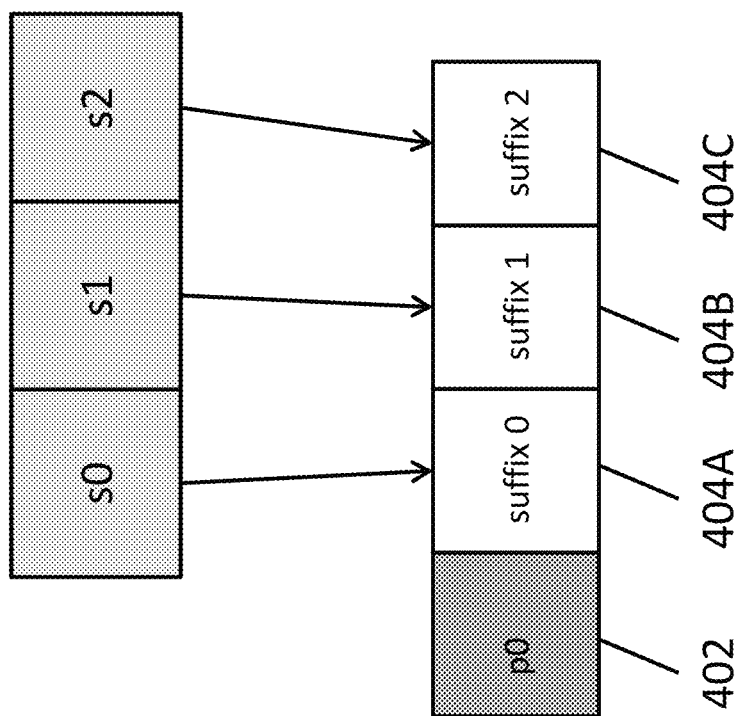
FIG. 4 is a schematic depiction of a 3×1 block and its encoded form using CPEC in the case of Display Stream Compression (DSC).

Entropy coders and common prefix entropy code (CPEC) are used in some standards such as Display Stream Compression (DSC). FIG. 4 is a schematic depiction of a 3×1 block and its encoded form using common prefix entropy code (CPEC) in the case of delta size unit-variable length coding (DSU-VLC) as used in Display Stream Compression (DSC). As shown in FIG. 4, with a block size of 3×1 (e.g., three adjacent samples of a row: s0; s1; and s2) in one group may be entropy coded using CPEC with one prefix (p0) 402 and three suffixes 404A, 404B, and 404C (suffix0, suffix1, and suffix2). Accordingly, because the parsing of the variable length prefix (p0) 402 may take a full clock cycle, but the three suffixes may be decoded without additional time from the entropy decoder, a throughput of 3 samples/clock is achievable, e.g., because there is one variable length binary word (VLB) (in the prefix 402) per for every three samples (s0, s1, and s2, as respectively represented by suffix0, suffix1, and suffix2).

Figure 5A:
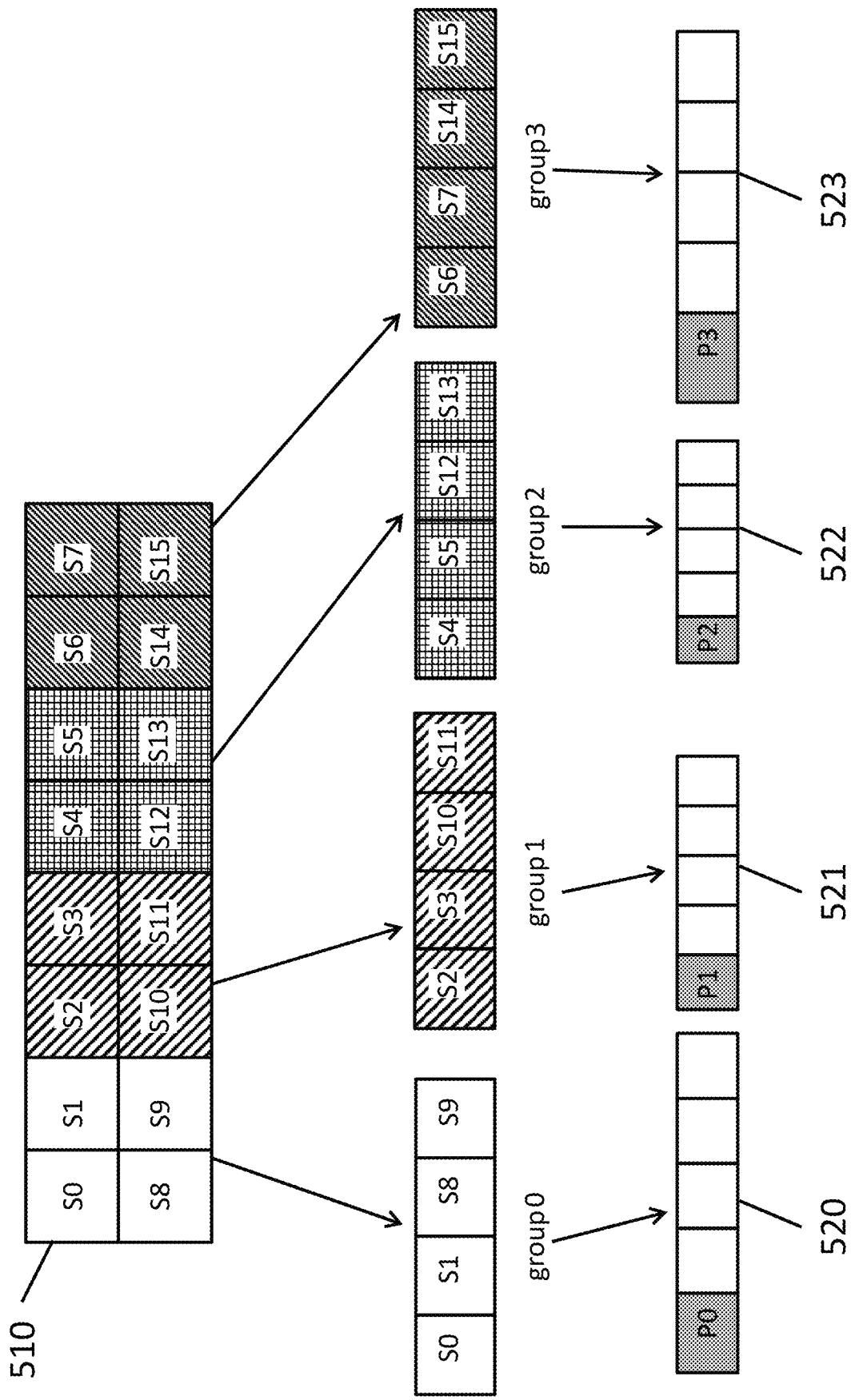
FIG. 5A is a schematic depiction of the division of a 8×2 block into four groups of uniform size (each group being a 2×2 portion of the block corresponding to four samples).

As another example, in the case of VESA Display Compression-M (VDC-M), a block size of 8×2 is used, where each component of the block is partitioned into four groups. In some modes, the 8×2 block is partitioned into uniform groups. FIG. 5A is a schematic depiction of the division of the 8×2 block 510 into four groups of uniform size (each group being a 2×2 portion of the block corresponding to four samples), labeled group0, group1, group2, and group3. The sixteen samples of block 510 are labeled S0 through S15. As shown in FIG. 5A, each group is entropy coded using CPEC with a corresponding variable length prefix and four suffixes to generate corresponding entropy coding groups 520, 521, 522, and 523. In particular, group0 includes symbols representing samples S0, S1, S8, and S9 and are entropy coded using prefix P0 as entropy coding group 520, group1 includes symbols representing samples S2, S3, S10, and S11 and are entropy coded using prefix P1 as entropy coding group 521, group2 includes symbols representing samples S4, S5, S12, and S13 and are entropy coded using prefix P2 as entropy coding group 522, and group3 includes symbols representing samples S6, S7, S14, and S15 and are entropy coded using prefix P3 as entropy coding group 523. FIG. 5A depicts the prefixes P0, P1, P2, and P3 using boxes of different widths to suggest that these variable length prefixes may have different lengths (e.g., encoding the number of bits used to encode each of the suffixes in their respective groups). Likewise, the suffixes of each of the groups have lengths that may vary in accordance with the values encoded by their corresponding prefixes.

Figure 5B:
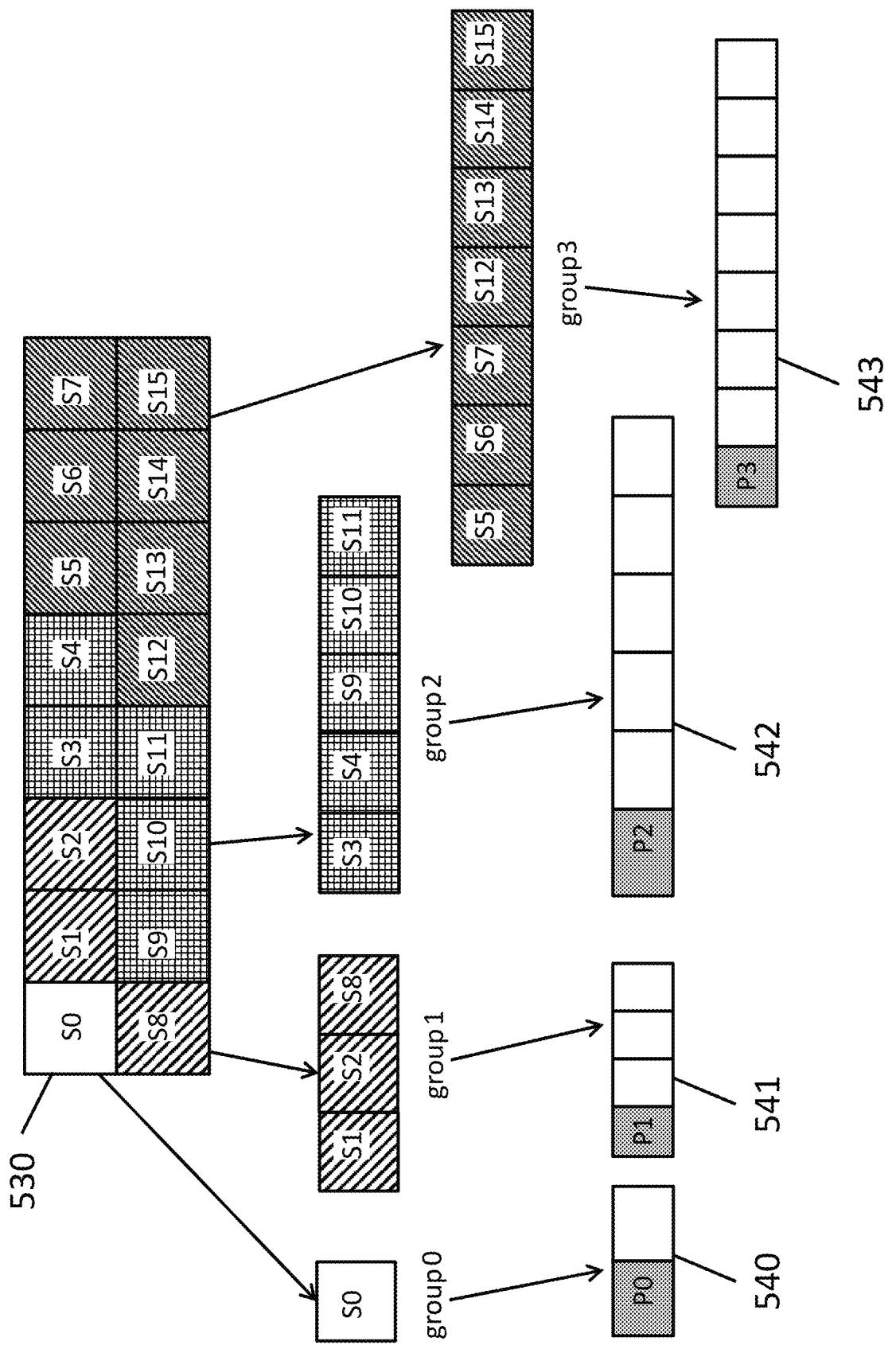
FIG. 5B is a schematic depiction of the division of an 8×2 block into four groups of non-uniform size.

In other modes, the 8×2 block is partitioned into non-uniform groups. FIG. 5B is a schematic depiction of the division of an 8×2 block 530 into four groups of non-uniform size, labeled group0, group1, group2, and group3. The sixteen samples of block 530 are labeled S0 through S15. In the arrangement shown in FIG. 5B, group0 has a size of 1 sample, group1 has size of 3 samples, group2 has a size of 5 samples, and group3 has a size of 7 samples. In particular, group0 includes symbols representing sample S0 and is entropy coded using prefix P0 as entropy coding group 540, group1 includes symbols representing samples S1, S2, and S8 and are entropy coded using prefix P1 as entropy coding group 541, group2 includes symbols representing samples S3, S4, S9, S10, and S11 and are entropy coded using prefix P2 as entropy coding group 542, and group3 includes symbols representing samples S5, S6, S7, S12, S13, S14, and S15 and are entropy coded using prefix P3 as entropy coding group 543. As in FIG. 5A, FIG. 5B depicts the prefixes P0, P1, P2, and P3 using boxes of different widths to suggest that these variable length prefixes may have different lengths (e.g., encoding the number of bits used to encode each of the suffixes in their respective groups). Likewise, the suffixes of each of the groups have lengths that may vary in accordance with the values encoded by their corresponding prefixes.

When using both uniform and non-uniform groups in VDC-M, CPEC is applied on a per group basis. Accordingly, an average throughput of 4 samples/clock is achievable in VDC-M, e.g., because, in both cases, four clock cycles are used to decode the variable length prefixes of the four groups which, together, encode the sixteen samples of the block (e.g., 16/4=4).

Different applications may impose different design constraints, such as available bandwidth on a physical medium 50, image resolution of the image content 10, frame rate of the image content, decoder clock speed, and power requirements or constraints (e.g., more stringent constraints on power consumption in handheld mobile devices such as smartphones, versus larger mobile devices such as laptops, and versus devices plugged into grid power such as televisions). For example, in many circumstances, the DDIC 200 of a display device 2 is significantly slower or may be built on older technology than, for example, the AP 100 or other component implementing the encoder 110. When designing communications channels for various applications, one design tradeoff can be made between throughput (TP) and compression efficiency (CE), where higher throughput generally corresponds to lower compression efficiency, and higher compression efficiency generally corresponds to lower throughput. As noted above, the DSU-VLC encoding of DSC uses one variable length code for every three samples, thereby achieving a throughput of three samples per clock, and the VDC-M encoding uses four variable length codes for every block of sixteen samples, thereby achieving a throughput of four samples per clock. While these approaches used by DSC and VDC-M enable systems to achieve particular throughputs, they do not allow adjustment of the coding scheme to change the throughput to meet design constraints (e.g., compression efficiency requirements, decoding clock speed, power requirements) of particular applications.

Accordingly, aspects of embodiments of the present disclosure relate to systems and methods for entropy coding method and/or protocol where a throughput of the entropy coding method can be adjusted by controlling the design parameters of the protocol. As noted above, the throughput of a decoder, in number of samples per clock of the decoder, is generally constrained based on the number of variable length codes that need to be parsed for each block of samples. Accordingly, some aspects of embodiments of the present disclosure relate to controlling the throughput by setting the number of variable length codes that are used when coding (or encoding) a number of samples (e.g., the number of variable length codes that are used to code a block of sixteen samples)

In more detail, some aspects of embodiments of the present disclosure relate to a hybrid entropy coding scheme in which each component (e.g., among the red, green, and blue components or among the luma and chroma components) of a block is coded in a manner in which one or more of the samples of the block are independently coded using symbol variable length codes and the remaining samples of the block are partitioned into groups and are coded using CPEC that assigns a variable length binary word per group. Examples of symbol variable length codes (SVLCs) include: unary; Huffman; Exponential-Golumb coding; Rice coding; concatenation of Exp-Golumb with Rice codes; and the like. In the following discussion, a block may be referred to as having N samples coded using SVLC and M samples coded using CPEC, where N and M are greater than or equal to zero. Some embodiments of the present disclosure relate to blocks where N and M are both greater than or equal to 1.

Accordingly, in a hybrid coding method according to embodiments of the present disclosure, the total number of variable length binary words (VLBs) per component per block can be controlled by the parameters N and M, thereby allowing design control of the decoder throughput in samples per clock.

In more detail, decoder throughput depends on the number of samples per component in a block and the total number of VLBs in the block:

$$DecoderThroughput \propto \frac{\text{\# samples per component in a block}}{\text{\# VLBs}}$$

$$DecoderThroughput = k\frac{\text{\# samples per component in a block}}{\text{\# VLBs}}$$

where $k \neq 0$.

The total number of variable length binary words used per component in a block depends on the number N of samples coded using SVLC and the number M of samples coded using CPEC coded groups:

VLBs=N+M

Figure 6:
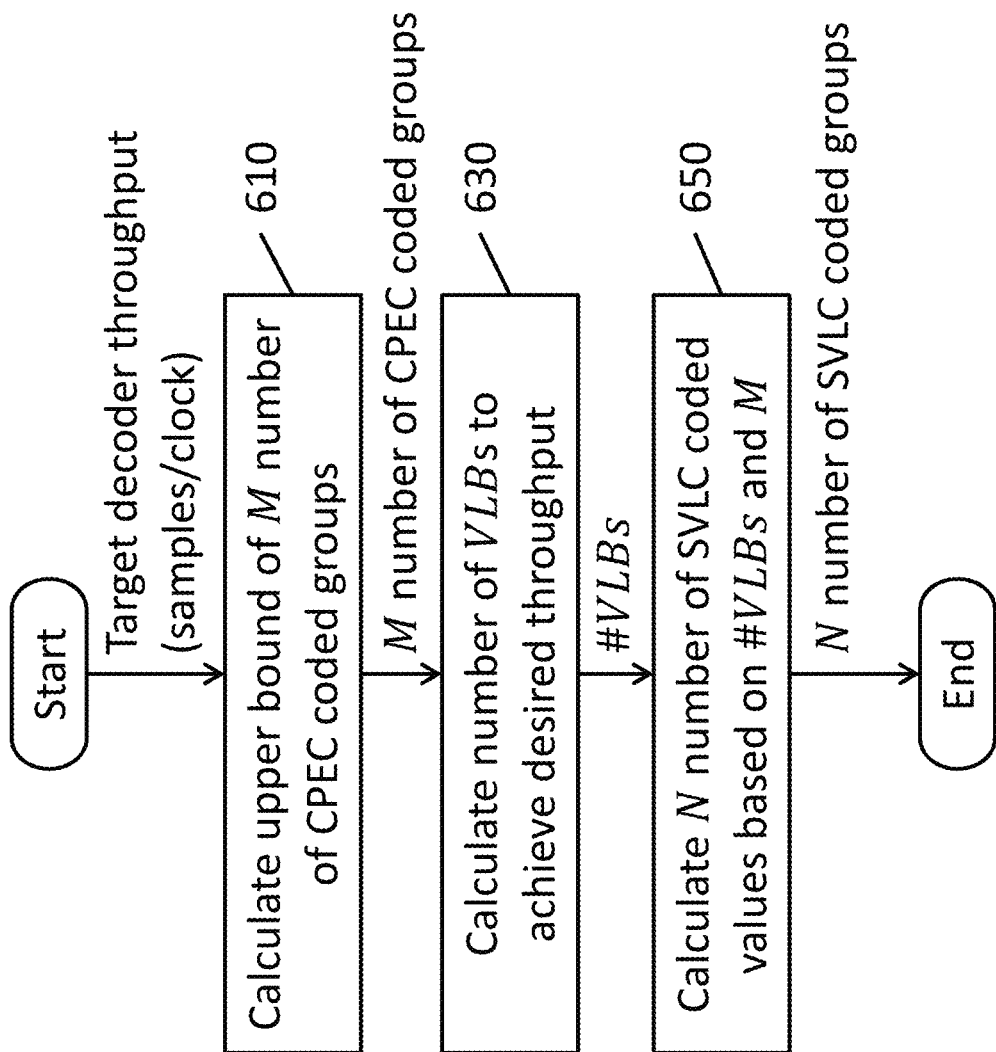
FIG. 6 is a flowchart of a method for computing the number N of samples coded using a symbol variable length code (SVLC) and the number M of samples for a given target decoder throughput according to one embodiment of the present disclosure.

FIG. 6 is a flowchart of a method for computing the number N of samples coded using SVLC and the number M of samples for a given target decoder throughput according to one embodiment of the present disclosure. In some embodiments, the method shown in FIG. 6 is implemented using an appropriate computing device, such as a computer system including a processor and memory where the memory stores instructions that, when executed by the processor, cause the processor to perform the operations of the method associated with FIG. 6 and to output the computed design parameters N and M.

In operation 610, the computer system according to one embodiment calculates an upper bound of M the number of CPEC coded groups. This can be calculated by setting the throughput to an estimated highest available value $TP_{max}$, which may depend on available technologies.

$$M = \frac{\text{\# samples per component per block}}{TP_{max}}$$

For example, in some circumstances, $TP_{max}$=4 samples per clock represents a good tradeoff between performance and complexity (or compression efficiency):

$$M = \frac{\text{\# samples per component per block}}{4}$$

However, embodiments of the present disclosure are not limited to a circumstance where the highest available throughput $TP_{max}$ is 4 samples per clock. For example, improvements in semiconductor technologies and compression may result in circumstances where a $TP_{max}$ value higher than 4 samples per clock represents a good tradeoff between performance and complexity.

In operation 630, the computing system calculates the number of variable length binary words (#VLBs) that are needed to achieve the input target decoder throughput $TP_{target}$:

$$\text{\# } VLBs = \frac{\text{\# samples per component block}}{TP_{target}}$$

In operation 650, the computing system calculates the number N of SVLC coded values to achieve the decoder throughput based on the previously calculated required number of VLBs (#VLBs) and the previously calculated value of M:

VLBs=N+M or

N=#VLBs−M

Accordingly, the method described above with respect to FIG. 6 provides a method for calculating the design parameters N and M based on a target decoder throughput.

For example, assuming a block size of 8×2 samples per component and assuming $TP_{max}$=4, the values of M and N may be calculated as follows:

For a target throughput of 2 samples per clock, per operation 610:

$$M = \frac{8 \times 2}{TP_{max}}$$
$$= \frac{16}{4}$$
$$= 4$$

per operation 630:

$$\text{\# } VLBs = \frac{16}{2}$$
$$= 8$$

and per operation 650:

$$N = VLBs - M$$
$$= 8 - 4$$
$$= 4$$

For a target throughput of 3 samples per clock, per operation 610:

$$M = \frac{8 \times 2}{TP_{max}}$$
$$= \frac{16}{4}$$
$$= 4$$

per operation 630:

$$\# \; VLBs = \frac{16}{3}$$
$$\approx 5$$

and per operation 650:

$$N = VLBs - M$$
$$= 5 - 4$$
$$= 1$$

For a target throughput of 4 samples per clock, per operation 610:

$$M = \frac{8 \times 2}{TP_{max}}$$
$$= \frac{16}{4}$$
$$= 4$$

per operation 630:

$$\# \; VLBs = \frac{16}{4}$$
$$= 4$$

and per operation 650:

$$N = VLBs - M$$
$$= 4 - 4$$
$$= 0$$

For a target throughput of 1 sample per clock, per operation 610:

$$M = \frac{8 \times 2}{TP_{max}}$$
$$= \frac{16}{4}$$
$$= 4$$

per operation 630:

$$\# \; VLBs = \frac{16}{1}$$
$$= 16$$

and per operation 650:

$$N = VLBs - M$$
$$= 16 - 4$$
$$= 12$$

In some embodiments of the present disclosure, instead of calculating parameters N and M for achieving a particular input target decoder throughput $TP_{target}$, the computing system calculates parameters N and M in accordance with a particular target compression efficiency. In more detail, compression efficiency may depend on: 1) compression ratio; 2) throughput; 3) complexity of the codec (which may also depend on throughput). For a given complexity of a codec (e.g., holding the complexity of the codec constant), a higher compression ratio will compromise throughput to get the same performance as a scheme having a lower compression ratio and high throughput. (For example, assuming there are two codecs A and B whose complexity and performance are roughly the same, then codec A may operate at a compression ratio of 6:1 (with a throughput of 1 pixel/clock and codec B may operate at a compression ratio of 4:1 with a throughput of 4 pixels/clock.)

According to some embodiments, these design parameters are selected during the design phase of the system, and are fixed for production of a finished product. However, embodiments of the present disclosure are not limited thereto and, in some embodiments, the parameters N and M controlling the number of SVLC samples and CPEC groups are dynamically set during use of the system in response to changing conditions (e.g., a changing communication environment in which a throughput may be reduced due to a need for additional error correction coding).

According to one embodiment of the present disclosure, the encoder 110, and/or the decoder 210, dynamically determines a target throughput or compression efficiency based on certain factors relating to the communication environment in which at least one of the encoder 110 or the decoder 210 is operating (e.g., one of the encoder 110 or the decoder 210 or both the encoder 110 and the decoder 210), and sets parameters M and N of the protocol accordingly (e.g., according to an updated target decoder throughput, based on the factors). In some embodiments, these factors include power (e.g., whether the device is plugged in to external power or on battery power), processor capabilities (e.g., throttling due to thermal conditions and/or power consumption settings), number of decoders working in parallel, internal bandwidth, heat or temperature conditions of the decoder circuit, and noise or interference in the physical medium 50 between the encoder and decoder.

In order for the encoder 110 to configure or set parameters M and N to determine the target throughput or compression efficiency based on these factors, some embodiments of the present disclosure provide a mechanism for feedback to the encoder 110. In some embodiments, this is performed in real-time (e.g. during live streaming, where the target can change mid-stream), or is performed when the encoder 110 first starts encoding for a particular decoder 210 (and the encoder can then consider the specifications of the decoder 210 or other factors, and use those specifications to set the target). Examples of types of feedback include the clock rate of the decoder 210, the current temperature of the decoder 210, power conditions (e.g., battery level or external power conditions) of the system that includes the decoder 210, and current conditions of the physical medium 50 through which the encoder 110 and the decoder 210 communicate (e.g., a wired or wireless connection, and available bandwidth or throughput of the physical medium 50 due to interference). The feedback can be, for example, direct from the decoder-side system 200 to the encoder-side system 100 (e.g., via the physical medium 50), or can be provided indirectly via a third system (e.g., a monitoring device configured to monitor conditions, such as temperature and power conditions, of the decoder-side system 200 and configured to provide information representing the monitored conditions to the encoder-side system 100).

According to some embodiments of the present disclosure, the decoder 210 also dynamically updates the parameters of the encoding scheme (values of M and N) in accordance with the changes to the parameters made by the encoder 110, so it can implement the proper decoding scheme. In some embodiments, the encoder 110 explicitly indicates the change to the decoder (when the change occurs, or that the change will occur at time T), and the explicit indication may be provided in-band (e.g., within the encoded bitstream 30 as the encoded image content) or out of band (e.g., in a separate channel, such as a separate communication stream in parallel with the encoded bitstream 30, over the same physical medium 50 or a different physical medium) In some embodiments, the decoder 210 independently considers the same factors as considered by the encoder 110 and performs the same analysis as the encoder 110 to predict when and how the encoder 110 will update the parameters of the encoding scheme (e.g., the values of M and N).

Figure 7:
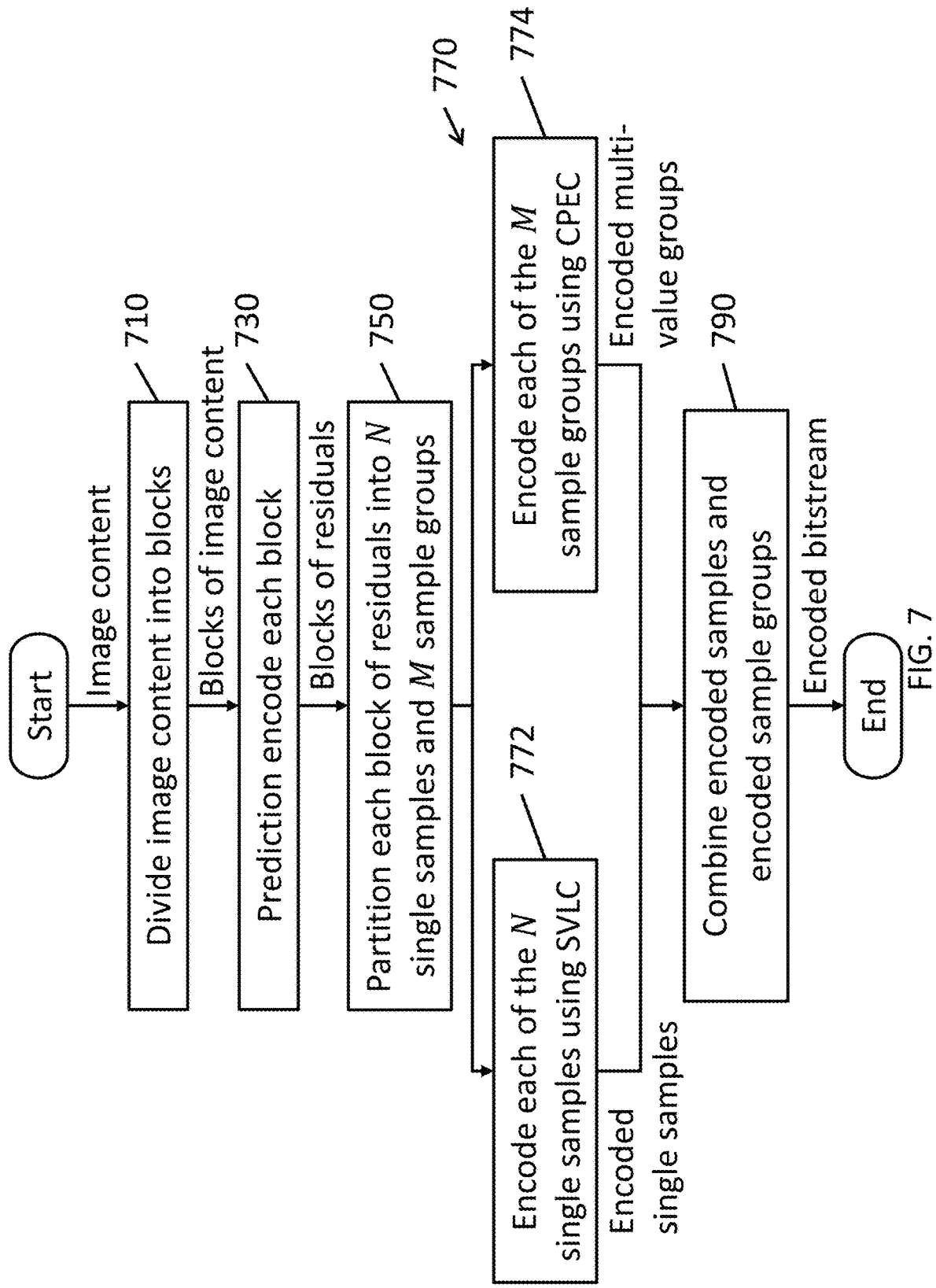
FIG. 7 is a flowchart of a method of encoding image content according to one embodiment of the present disclosure.

FIG. 7 is a flowchart of a method of encoding image content according to one embodiment of the present disclosure. According to some embodiments, the operations described with respect to FIG. 7 are performed by the encoder 110 to generate the encoded bitstream 30 based on supplied image content 10. In operation 710, each channel of the image content is divided into a plurality of blocks of contiguous samples (e.g., samples from a region of adjacent pixels). In some embodiments, the image content is converted between different color spaces, such as from RGB to YCoCg or YCbCr. In operation 730, the encoder 110 prediction encodes each block, where the prediction coding may be, for example, transform mode coding, transform skip, block prediction mode coding, and the like. In more detail, the prediction coding in operation 730 may include using a predictor to predict the values of each component (e.g., the Y, Cb, and Cr components) of the block based on reconstructed sample values from neighboring blocks (e.g., previous row and/or previous column of the image content). The encoder 110 then computes residuals based on the differences between the predicted values and the actual values. In some embodiments, when using a lossy coding scheme, the residuals are quantized to generate a block of quantized residuals. As noted above, different blocks of the same image content may have different types of prediction coding applied (e.g., some blocks may use transform mode while other blocks from the same image may use transform skip, block prediction mode—in some embodiments, at the encoder, each prediction coding mode is applied to each block to generate a plurality of encoded blocks, one for each of the different modes, and the encoder outputs the encoded block that has the lowest rate-distortion cost). At operation 750, the encoder 110 partitions each encoded block into N single samples and M sample groups (e.g., the encoder 110 takes N samples from the block and groups the remaining samples into M groups, where each of the M groups includes one or more samples, and where each of the samples of the block appears only once among the N single samples and the M sample groups). For example, in some embodiments, the decoder takes the first N samples of the block (e.g., samples S0 to S(N−1)) as the N single samples and partitions the remaining samples into M sample groups.

In operation 770, the encoder 110 applies entropy coding to the residuals. At operation 772, the encoder 110 encodes each of the N single samples using symbol-based variable length code (SVLC) such as unary coding; Huffman coding; Exponential-Golumb coding; Rice coding; concatenation of Exp-Golumb with Rice codes; and the like, to generate encoded single samples. Likewise, at operation 774, the encodes the M sample groups using common prefix entropy code (CPEC) (or some other code in which one or more samples are coded using exactly one variable length prefix and one or more fixed length suffixes) to generate encoded sample groups.

At operation 790, the encoder 110 combines (e.g., concatenates) the encoded single samples with the encoded sample groups to generate a data stream (e.g., the encoded bitstream 30).

Figure 8:
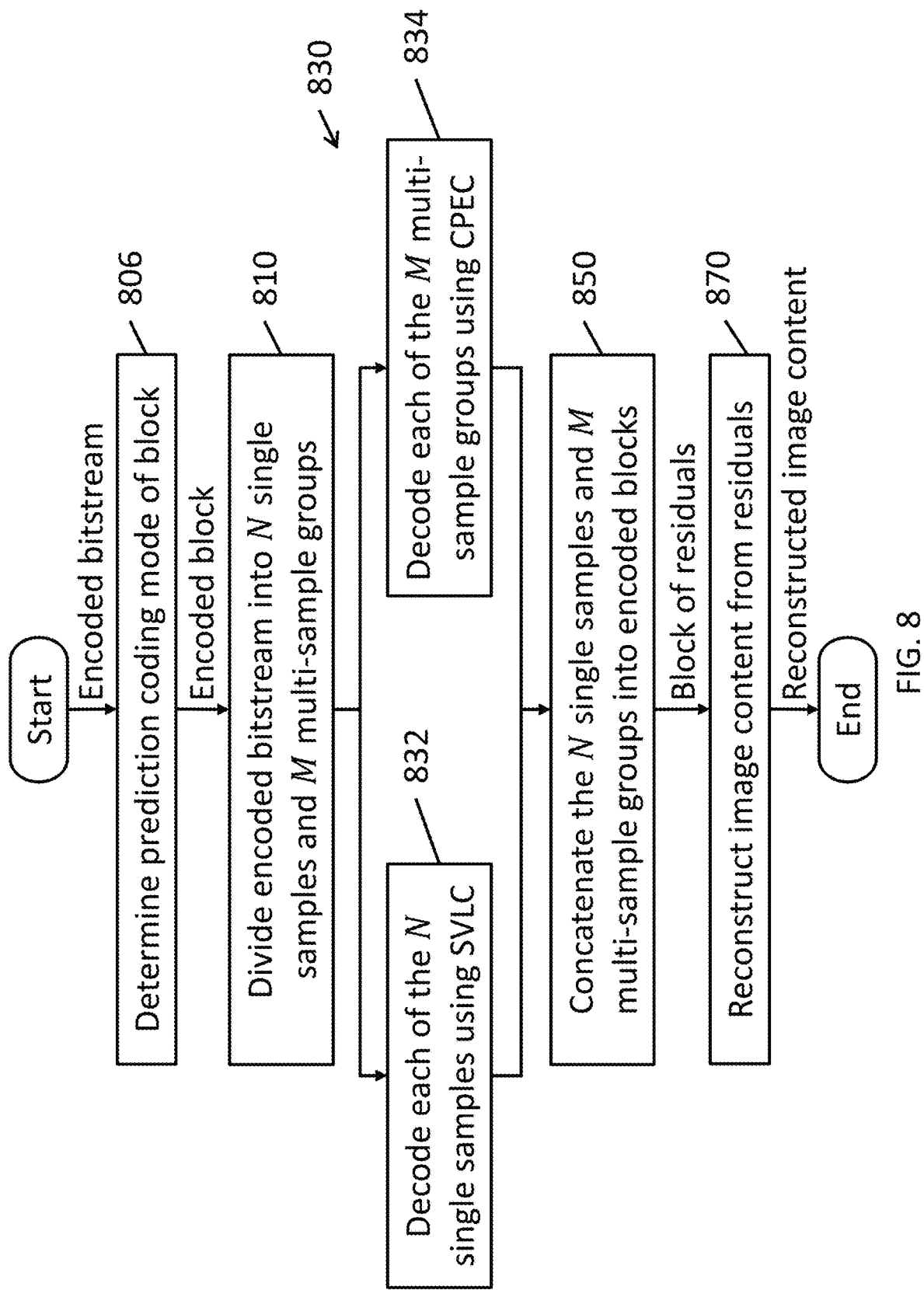
FIG. 8 is a flowchart of a method of decoding image content according to one embodiment of the present disclosure.

FIG. 8 is a flowchart of a method of decoding image content according to one embodiment of the present disclosure. According to some embodiments, the operations described with respect to FIG. 8 are performed by the decoder 210 to generate the reconstructed image content 18 based on received encoded bitstream 30. The particular predictive coding technique (e.g., transform mode versus block prediction, transform skip mode) may vary from block to block in accordance with the technique that is selected by the encoder (e.g., in accordance with minimizing the rate-distortion cost). Accordingly, in some embodiments, the encoder includes an explicit indication of the predictive coding mode (e.g., a flag) in the encoded bitstream 30 and, in some embodiments, the decoder 210 automatically determines the prediction coding mode from the encoded bitstream 30. In operation 806, the decoder 210 determines the prediction coding mode of the current block of the encoded bitstream 30, such as by determining which of a plurality of different coding modes is indicated for the block, such as through a flag, or other identifier, in the encoded bitstream 30. In operation 810, the decoder 210 partitions the received encoded bitstream into N single samples and M sample groups (e.g., the first N VLBs may be treated as the N single samples, and the remaining data may be parsed as CPEC encoded groups). As noted above, for receiving a single block, operation 810 may take a number of clocks equal to the number of variable length binary words (VLBs) used to encode the block, because each VLB takes one clock cycle to parse, but if the VLB is serving as the prefix to a group (e.g., a sample group), then the fixed length suffixes can be shifted to another buffer for further processing without slowing down the decoder 210.

In operation 830, the decoder 210 entropy decodes the residuals. In operation 832, the decoder 210 decodes each of the N single samples using a SVLC code, as discussed above (e.g., unary code or a Huffman code), and in operation 834 decodes each of the M sample groups using CPEC, where the number of samples in each of the M sample groups may be determined by the prediction coding mode of the block determined at operation 806 (e.g., whether the M sample groups are encoded using uniform or non-uniform groups, as discussed in more detail below with respect to FIGS. 9A and 9B). In some circumstances, N is zero and operation 832 is omitted. The decoder 210 may then concatenate the samples from the N single samples and the M sample groups into a block of residuals in operation 850, and then apply the corresponding prediction coding (e.g., the appropriate inverse of the operation performed by the encoder 110) to reconstruct each component (e.g., the Y, Cb, and Cr components) of the block in operation 870. Generally, the reconstruction process is the inverse of the encoding process described above with respect to FIG. 7 and includes performing entropy decoding, dequantizing to generate reconstructed residuals, performing an inverse transform (if transform mode is used in this block), computing predicted samples based on neighboring samples (e.g., previously reconstructed neighboring blocks, such as blocks of a previous row and/or previous column of the image content), and then adding the residuals to the output of a predictor.

Examples of encodings of blocks of data in accordance with embodiments of the present disclosure will be described in more detail below in the context of an 8×2 block of 16 samples and a target throughput $TP_{target}$ of 2 samples per clock. However, embodiments of the present disclosure are not limited to the particular contexts presented below. For example, embodiments of the present disclosure may also be applied to blocks of different sizes and/or dimensions, such as 3×1, 4×8, 8×8, and the like, and may also be applied to different target throughput $TP_{target}$ values such as 3 samples per clock by choosing the parameters N and M as discussed above with respect to FIG. 6. In addition, the samples may be coded using 2's complement or sign-magnitude representations.

One example CPEC output for an entropy coding group with 4 samples having sample values {1, −2, −1, 0} is presented as follows. In this example, two's complement representation is used to generate the bits for the sample values in the entropy coding group. The number of bits required for a faithful reconstruction of this group is 2. In particular, in two's complement representation, n bits are required to represent data in the range $[-2^{n-1}, 2^{n-1}-1]$. Each sample value is represented by 2 bits in two's complement representation. Therefore, the prefix will signal the value of 2. For the group of sample values {1, −2, −1, 0}, the bits outputted by the CPEC operation would be a prefix of 110 (unary code of 2) and four suffixes where each sample is coded using 2 bits, such as "01 10 11 00". The output of the CPEC operation in this example is illustrative only and the actual output of the CPEC operation might be different depending on the actual implementation.

When sign-magnitude representation is used, n bits are required for each sample, where the absolute value (or magnitude) of all the samples in the group are in the data range of $[0, 2^n-1]$. In the sign-magnitude representation, the sign bit is signaled only for the non-zero values. An example, for the input group of sample values {1, −2, −1, 0}, the output of CPEC operation in sign-magnitude representation would be a prefix of 110 (unary code of 2), followed by suffixes that codes the absolute value of each sample using 2 bits, such as "01 10 01 00", and at last the sign bits "1 0 0", using 1 to represent a positive symbol (for the first value 1) and 0 is used to represent a negative symbol (for the second and third values −2 and −1). (Note that, in this example, the sign value of the symbol 0 is not signaled.) In some embodiments, 0 is used to represent a positive symbol and 1 is used to represent a negative symbol The partitioning of a block into M groups may be done in a uniform or a non-uniform manner. In a uniform partitioning, the number of samples (or fixed length suffixes) in each of the M groups is the same. In a non-uniform partitioning, the number of samples varies from one group to another (e.g., at least two of the M groups have different numbers of samples). The choice of a partitioning into uniform versus non-uniform groups may be made based on the prediction coding mode used to encode the block. For example, blocks encoded using transform mode are generally better suited to non-uniform groups.

Figure 9A:
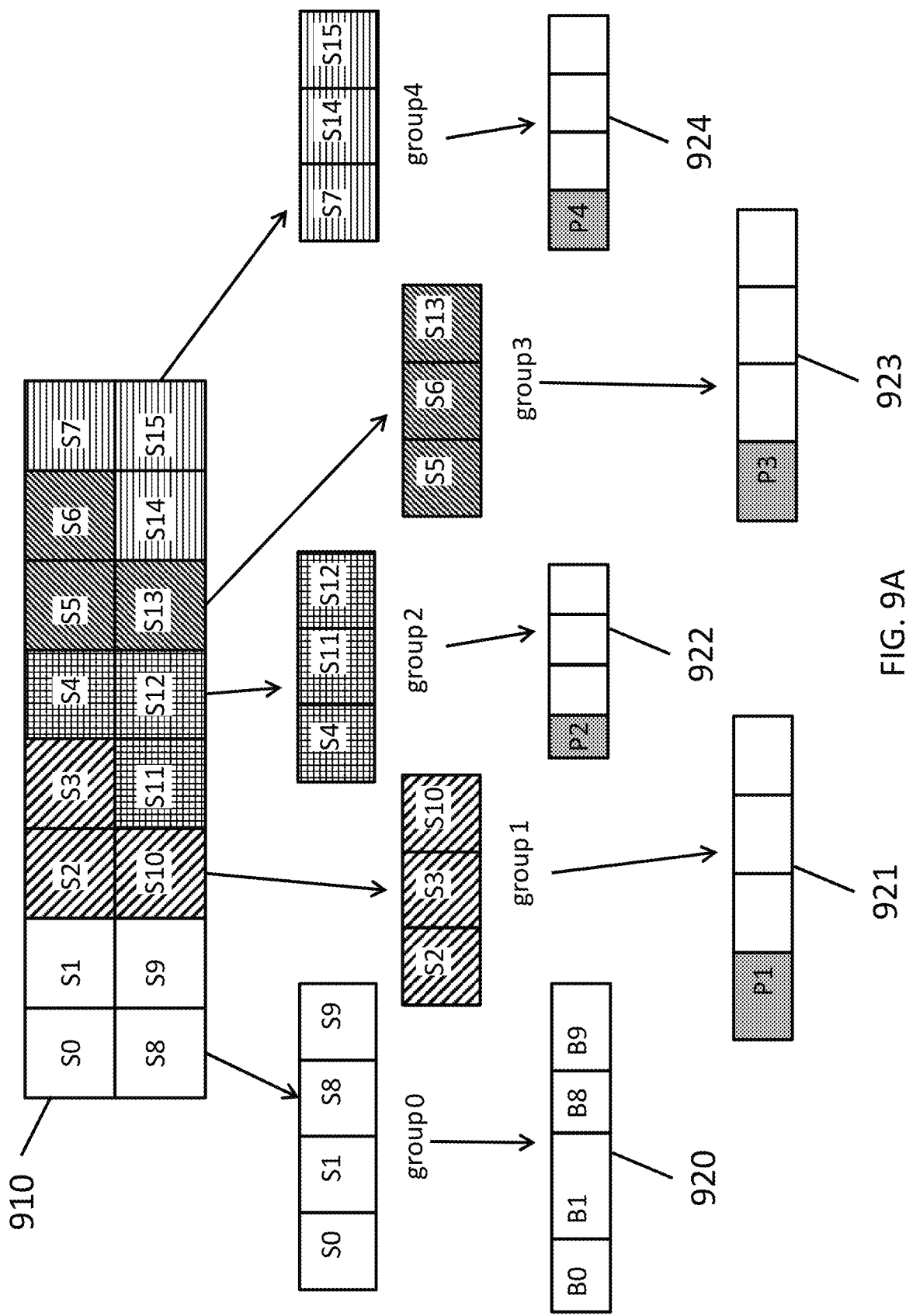
FIG. 9A is a schematic depiction of the encoding of a block using uniform groups according to one embodiment of the present disclosure.

FIG. 9A is a schematic depiction of the encoding of a block using uniform groups according to one embodiment of the present disclosure. In the particular example shown in FIG. 9A, the block 910 represents an 8×2 rectangle of samples taken from one component of an input image (e.g., taken from one component of image content 10). Uniform groups may be applied when the block 910 is prediction coded using transform skip, block prediction modes (e.g., where the symbols S0 through S15 of the block represent the quantized residuals of the underlying samples of the component of the image, rather than coefficients of a transform such as a DCT of a portion of the image).

In the example shown in FIG. 9A, the coding scheme was designed for a throughput of 2 samples per clock. Therefore, following the calculations described above with respect to FIG. 6, the number N of samples coded using a symbol variable length code (SVLC) is 4, and the number M of sample groups is also 4. Each of the M sample groups includes one prefix and three suffixes. This results in a total of 8 (N+M=8) variable length binary words (VLBs) in the bitstream per block of 16 samples (N+M*3=16), which provides the target throughput of 2 samples per clock (16 samples/8 clocks). The N samples coded using SVLC are labeled in FIG. 9A as group0 920 and the M sample groups are labeled group1 921, group2 922, group3 923, and group4 924. The five groups shown in FIG. 9A are summarized in Table 1, below, along with their corresponding coding methods and total number of variable length binary words (VLBs) in each group.

TABLE 1

| Group Index | Coding method | Number of samples | Total VLB |
|---|---|---|---|
| group0 | SVLC | 4 | 4 |
| group1 | CPEC | 3 | 1 |
| group2 | CPEC | 3 | 1 |
| group3 | CPEC | 3 | 1 |
| group4 | CPEC | 3 | 1 |

In the arrangement shown in FIG. 9A and Table 1, the bit representations B0, B1, B8, and B9 of the samples S0, S1, S8, and S9 n group0 920 are decoded sequentially because the boundaries between the symbols are unknown or obscured because each of the samples is coded as a VLB. The bit representations B0, B1, B8, and B9 of the samples S0, S1, S8, and S9 are depicted in FIG. 9A using boxes of different widths to suggest that these SVLC coded symbols have different lengths. According to the embodiment of the coding scheme shown in FIG. 9A, group0 920 represents samples S0, S1, S8, and S9. However, embodiments of the present disclosure are not limited thereto, and the group of SVLC coded samples may represent different samples of the block 910.

FIG. 9A depicts the prefixes P1, P2, and P3 using boxes of different widths to suggest that these variable length prefixes may have different lengths (e.g., encoding the number of bits used to encode each of the suffixes in their respective groups). Likewise, the suffixes of each of the groups have lengths that may vary in accordance with the values encoded by their corresponding prefixes. The three suffixes in each of group1, group2, group3, and group4 can be parsed in parallel once their respective VLB prefixes P1, P2, P3, and P4 are parsed. According to the embodiment of the coding scheme shown in FIG. 9A, group1 921 represents samples S2, S3, and S10, group2 922 represents samples S4, S11, and S12, group3 923 represents samples S5, S6, and S13, and group4 924 represents samples S7, S14, and S15. However, embodiments of the present disclosure are not limited thereto, and the sample groups may represent different samples of the block 910.

Figure 9B:
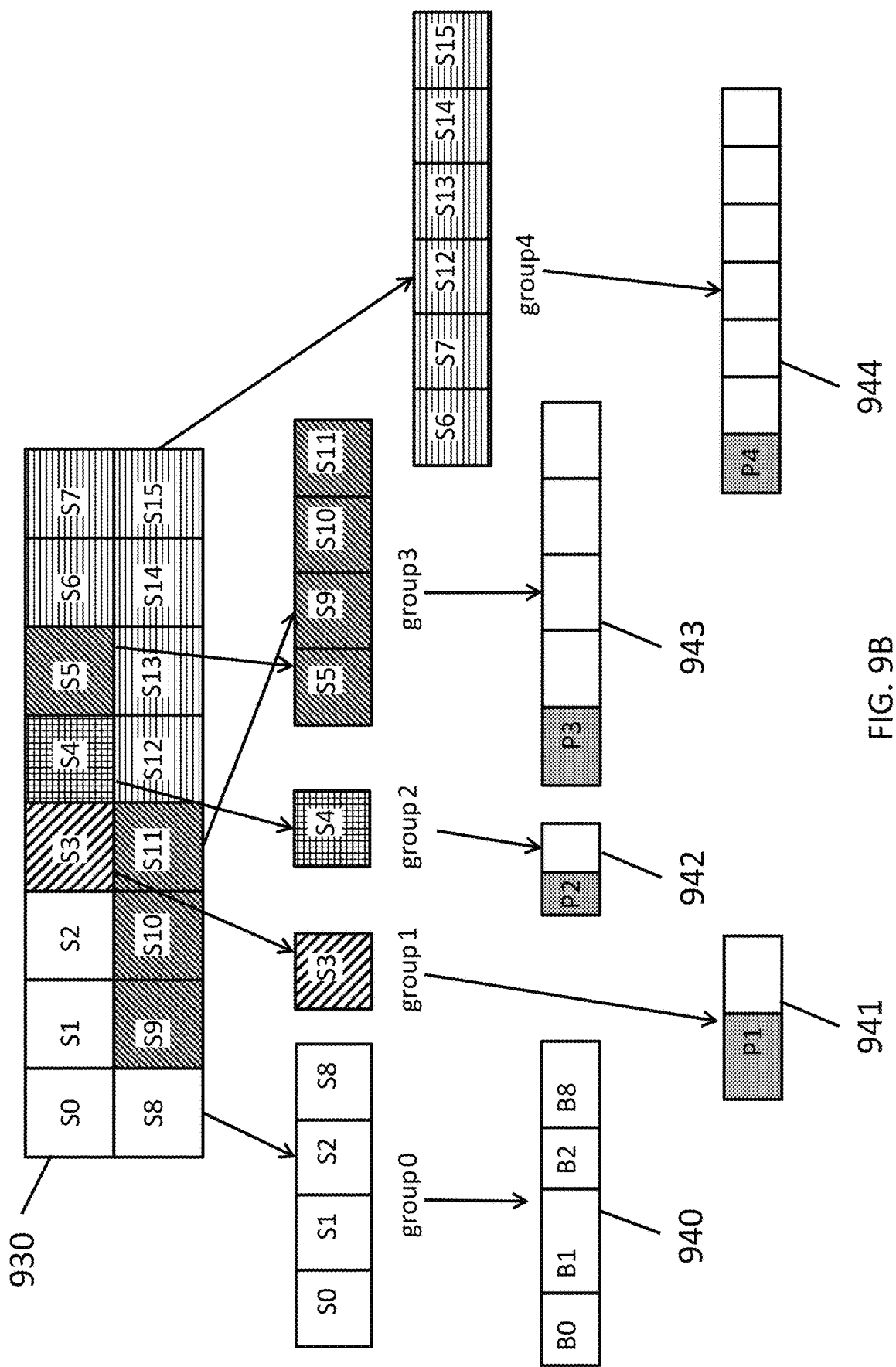
FIG. 9B is a schematic depiction of the encoding of a block using non-uniform groups according to one embodiment of the present disclosure.

FIG. 9B is a schematic depiction of the encoding of a block using non-uniform groups according to one embodiment of the present disclosure. In the particular example shown in FIG. 9A, the block 930 represents an 8×2 rectangle of samples taken from one component of an input image (e.g., taken from one component of image content 10). Non-uniform groups may be applied when the block 930 is prediction coded in accordance with a transform mode (e.g., where the samples S0 through S15 of the block 930 represent quantized coefficients of a transform, such as spatial frequency-domain such as a discrete cosine transform (DCT), of the quantized residuals of the block).

In the example shown in FIG. 9B, the coding scheme was designed for a throughput of 2 samples per clock. Therefore, following the calculations described above with respect to FIG. 6, the number N of samples coded using a symbol variable length code (SVLC) is 4, and the number M of sample groups is also 4. The four samples coded using SVLC are labeled group0 940 in FIG. 9B, and the four sample groups are labeled group1 941, group2 942, group3 943, and group4 944. Each of the M sample groups includes one prefix and various numbers of suffixes. The number of suffixes may be set during the design of the encoding scheme (e.g., alongside the choice of parameters N and M based on the target throughput and in accordance with the size of the block). In the particular embodiment shown in FIG. 9B, group1 941 includes a prefix P1 and only one suffix and group2 942 includes a prefix P2 and only one suffix (e.g., group1 941 and group2 942 each include only one value). Group3 943 includes a prefix P3 and four suffixes, and group4 944 includes a prefix P4 and six suffixes. This results in a total of 8 (N+M=8) variable length binary words (VLBs) in the bitstream per block of 16 samples (4+1+1+4+6=16), which provides the target throughput of 2 samples per clock (16 samples/8 clocks). The five groups shown in FIG. 9B are summarized in Table 2, below, along with their corresponding coding methods and total number of variable length binary words (VLBs) in each group.

TABLE 2

| Group Index | Coding method | Number of samples | Total VLB |
| --- | --- | --- | --- |
| group0 | SVLC | 4 | 4 |
| group1 | CPEC | 1 | 1 |
| group2 | CPEC | 1 | 1 |
| group3 | CPEC | 4 | 1 |
| group4 | CPEC | 6 | 1 |

In the arrangement shown in FIG. 9B and Table 2, the bit representations B0, B1, B2, and B8 of the samples S0, S1, S2, and S8 in group0 940 are decoded sequentially because the boundaries between the symbols are unknown or obscured because each of the samples is coded as a VLB. The bit representations B0, B1, B2, and B8 of the samples S0, S1, S2, and S8 are depicted in FIG. 9B using boxes of different widths to suggest that these SVLC coded symbols have different lengths. According to the embodiment of the coding scheme shown in FIG. 9B, group0 940 represents samples S0, S1, S2, and S8. However, embodiments of the present disclosure are not limited thereto, and the group of SVLC coded samples may represent different samples of the block 930.

As in FIG. 9A, FIG. 9B depicts the prefixes P1, P2, and P3 using boxes of different widths to suggest that these variable length prefixes may have different lengths (e.g., encoding the number of bits used to encode each of the suffixes in their respective groups). Likewise, the suffixes of each of the groups have lengths that may vary in accordance with the values encoded by their corresponding prefixes. The suffixes in each of group1, group2, group3, and group4 can be parsed in parallel once their respective VLB prefixes P1, P2, P3, and P4 are parsed. According to the embodiment of the coding scheme shown in FIG. 9B, group1 941 represents sample S3, group2 942 represents sample S4, group3 943 represents samples S5, S9, S10, and S11, and group4 944 represents samples S6, S7, S12, S13, S14, and S15. However, embodiments of the present disclosure are not limited thereto, and the sample groups may be of different sizes and may represent different samples of the block 930.

In some embodiments of the present disclosure, the CPEC coded groups that include only one sample are coded using SVLC instead. For example, referring to FIG. 9B, group1 and group2 each include only one sample. Accordingly, rather than encode each of them with corresponding variable length prefixes (P1 and P2, respectively) and corresponding suffixes, these two samples may be encoded directly using SVLC (see, e.g., FIG. 9C, described below). Some aspects of embodiments of the preset disclosure relate to a method for the encoder 110 to select between encoding the single samples using SVLC or a CPEC group with a single value. For example, the choice between SVLC or CPEC may depend on the sample distribution and the SVLC coding method. As one example, suppose the sample value is −1. Using CPEC coding and two's complement, the value of −1 can be represented using a single bit having a value of 1. Therefore, the prefix of the CPEC group specifying a suffix of length 1 is "10", and the suffix is the value 1, as described above, for a total of 3 bits. On the other hand, when using SVLC and, for example, Huffman coding, it may turn out that −1 is a very improbable sample value in the given environment and therefore the particular codebook for the environment represents the sample value of −1 using more than 3 bits. On the other hand, there may be circumstances when the sample value is of high probability and therefore has a short representation in a Huffman code, but may also require many more bits to represent using two's complement and CPEC. In such a situation SVLC may be a more efficient method for coding that sample value. Accordingly, in some embodiments of the present disclosure, the encoder 110 dynamically selects whether to encode single samples using SVLC or CPEC based on the efficiency of encoding the data using the two different techniques and the encoder may include the selected choice in the bitstream. In some embodiments, the choice of SVLC or CPEC is determined based on the flags included in the bitstream 30, as part of determining the prediction coding mode of the block in operation 806, and in some embodiments, flags indicating whether the single samples are encoded using SVLC or CPEC are located in other parts of the encoded bitstream 30, such as immediately before the M sample groups. Table 3, below, summarizes a modified version of the encoding shown in FIG. 9B in accordance with this embodiment:

TABLE 3

| Group Index | Coding method | Number of samples | Total VLB |
|---|---|---|---|
| group0 | SVLC | 4 | 4 |
| group1 | SVLC | 1 | 1 |
| group2 | SVLC | 1 | 1 |
| group3 | CPEC | 4 | 1 |
| group4 | CPEC | 6 | 1 |

Figure 9C:
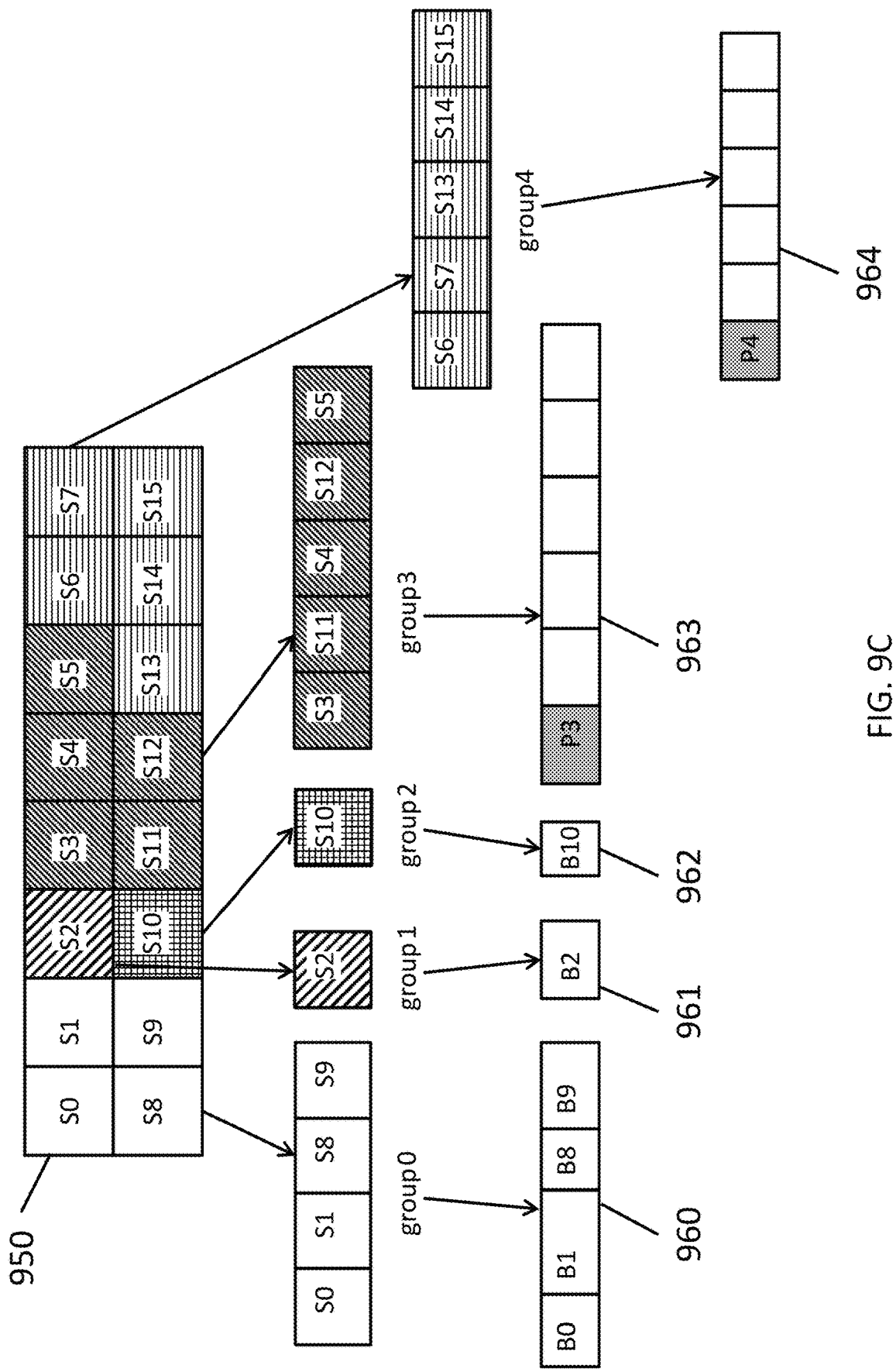
FIG. 9C is a schematic depiction of the encoding of a transform skip and block prediction encoded block using non-uniform groups according to one embodiment of the present disclosure.

In addition, in some embodiments of the present disclosure, partitioning a block into multiple non-uniform groups is also applied when the block is encoded using transform skip, block prediction modes. FIG. 9C is a schematic depiction of the encoding of a transform skip, block prediction encoded block using non-uniform groups according to one embodiment of the present disclosure. In the particular example shown in FIG. 9C, the block 950 represents an 8×2 rectangle of samples taken from one component of an input image (e.g., taken from one component of image content 10). Non-uniform groups may also be applied when the block 950 is prediction coded in accordance with transform skip, block prediction modes.

In the example shown in FIG. 9C, the coding scheme was designed for a throughput of 2 samples per clock. Therefore, following the calculations described above with respect to FIG. 6, the number N of samples coded using a symbol variable length code (SVLC) is 4, and the number M of sample groups is also 4. The four samples coded using SVLC are labeled group0 960 in FIG. 9C, and the four sample groups are labeled group1 961, group2 962, group3 963, and group4 964. Each of the M sample groups includes one prefix and various numbers of suffixes. The number of suffixes may be set during the design of the encoding scheme (e.g., alongside the choice of parameters N and M based on the target throughput and in accordance with the size of the block). In the particular embodiment shown in FIG. 9C, if encoded using CPEC, group1 961 would include a prefix P1 and only one suffix and group2 962 would include a prefix P2 and only one suffix (e.g., group1 961 and group2 962 each include only one value). Accordingly, as discussed above and as shown in FIG. 9C, in some embodiments these samples are encoded using SVLC instead of CPEC. Group3 963 includes a prefix P3 and five suffixes, and group4 includes a prefix P4 and five suffixes. This results in a total of 8 (N+M=8) variable length binary words (VLBs) in the bitstream per block of 16 samples (4+1+1+5+5=16), which provides the target throughput of 2 samples per clock (16 samples/8 clocks). The five groups shown in FIG. 9C are summarized in Table 4, below, along with their corresponding coding methods and total number of variable length binary words (VLBs) in each group.

TABLE 4

| Group Index | Coding method | Number of samples | Total VLB |
|---|---|---|---|
| group0 | SVLC | 4 | 4 |
| group1 | SVLC | 1 | 1 |
| group2 | SVLC | 1 | 1 |
| group3 | CPEC | 5 | 1 |
| group4 | CPEC | 5 | 1 |

In the arrangement shown in FIG. 9C and Table 4, the bit representations B0, B1, B8, and B9 of the samples S0, S1, S8, and S9 in group0 960 are decoded sequentially because the boundaries between the symbols are unknown or obscured because each of the samples is coded as a VLB. The bit representations B0, B1, B8, and B9 of the samples S0, S1, S8, and S9 are depicted in FIG. 9C using boxes of different widths to suggest that these SVLC coded symbols have different lengths. According to the embodiment of the coding scheme shown in FIG. 9C, group0 940 represents samples S0, S1, S8, and S8. However, embodiments of the present disclosure are not limited thereto, and the group of SVLC coded samples may represent different samples of the block 950.

FIG. 9C depicts the prefixes P3 and P4 using boxes of different widths to suggest that these variable length prefixes may have different lengths (e.g., encoding the number of bits used to encode each of the suffixes in their respective groups). Likewise, the suffixes of each of the groups have lengths that may vary in accordance with the values encoded by their corresponding prefixes. The suffixes in each of group1, group2, group3, and group4 can be parsed in parallel once their respective VLB prefixes P3, and P4 are parsed. According to the embodiment of the coding scheme shown in FIG. 9C, group1 961 represents sample S2, group2 942 represents sample S10, group3 963 represents samples S3, S11, S4, S12, and S5, and group4 964 represents samples S6, S7, S13, S14, and S15. However, embodiments of the present disclosure are not limited thereto, and the sample groups may be of different sizes and may represent different samples of the block 950. Because FIG. 9C depicts a block that is coded using a transform skip, block prediction mode, the groups are selected as contiguous groups.

In some embodiments, a skip flag is used to signal when all sample values within a group or within a component are zero. In some embodiments, a component skip flag is used when all samples in one component of a block are zeroes (e.g., a chrominance orange component or chrominance green component in a YCoCg or YCbCr color space, because a luma component Y is rarely all zeroes).

In some embodiments, a group skip flag is used when all samples in one group are zeroes. In some embodiments, samples that are coded using SVLC are partitioned into one or more groups and the group skip flag can be applied to all samples within the group of SVLC coded samples. In some embodiments, the group skip flag is used with CPEC coded groups. In some embodiments, the group skip flag is used only with CPEC coded groups, and not used with other groups such as SVLC coded groups. Groups containing all zeroes may commonly occur when using a transform mode prediction mode for encoding a block, because, for example, a block having low spatial frequency may result in many of the coefficients being zero.

Some aspects of embodiments of the present disclosure relate to adjusting the coding arrangements to accommodate different sampling formats. For example, in a 4:2:2 chroma format, the chroma blocks (e.g., Cb and Cr components of a YCbCr format) contain half as many samples as the luma (Y) component blocks due to horizontal subsampling. As another example, in a 4:2:0 chroma format, the chroma blocks contain a quarter of the number of samples as the luma (Y) component blocks due to both horizontal and vertical subsampling.

Accordingly, some aspects of embodiments of the present disclosure relate to maintaining the same decoding throughput for 4:2:2 and 4:2:0 chroma formats. In some embodiments, the total number of groups M and the number of single values N are calculated such that the total number of VLBs for the chroma component are no greater than half (in the case of a 4:2:2 chroma format) or a quarter (in the case of a 4:2:0 chroma format) of the number of VLBs for the luma component. For example, referring to the example embodiment described above with a block size of 8×2 for a total of 16 samples, for 4:2:2 content, the number of luma samples is 16 and the number of chroma samples is 8, and therefore the upper bound of M, coded using CPEC, in the bitstream for 4:2:2 for a luma block is 4 (16/4=4) and for a chroma block is 2 (8/4=2). In the case of 4:2:0 content, the number of luma samples is 16, and the number of chroma samples is 4, and therefore the upper bound of M in the bitstream for 4:2:0 for a luma block is 4 (16/4=4) and for a chroma block is 1 (4/4=1).

As such, aspects of embodiments of the present disclosure relate to systems and methods for implementing a coding method in which the throughput of the coding protocol, as measured in symbols per decoder clock, is adjustable. Some aspects of embodiments of the present disclosure relate to adjusting the throughput by modifying the number of variable length binary words (VLBs) that are used to encode a given block in the encoded bitstream. In more detail, it is assumed that a decoder takes one full clock cycle to parse a given VLB, and therefore a target throughput can be achieved by dividing the number of samples per block by the target throughput to arrive at a target number of VLBs per block. The target number of VLBs can then be controlled by encoding some of the samples using symbol variable length codes (SVLCs) and some of the samples using a code in which a single variable length code is shared by a number of samples that are encoded using fixed length codes (e.g., common prefix entropy code or CPEC). Accordingly, aspects of embodiments of the present disclosure enable a protocol or class of protocols that are adjustable to meet the target throughput of particular applications, thereby allowing for more design flexibility when making tradeoffs between throughput and compression efficiency.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method for decoding image content from an encoded bitstream comprising a plurality of blocks, the method comprising:
   dividing, by a decoder circuit, a block comprising one or more components of the image content into one or more single samples corresponding to one of the one or more components by taking the one or more single samples from the block;
   decoding, by the decoder circuit, each of the one or more single samples using a symbol variable length code (SVLC) to generate one or more decoded single samples, each sample of the one or more single samples being entirely coded as a separate variable length binary word; and
   reconstructing, by the decoder circuit, image content based on previously reconstructed neighboring blocks of the image content and the decoded single samples.

2. The method of claim 1, wherein the dividing of the block further comprises grouping, by the decoder circuit, remaining samples of the block into one or more sample groups.

3. The method of claim 1, wherein the encoded bitstream further comprises a component skip flag indicating that all of a plurality of samples of a corresponding component of the block of the encoded stream are zeroes.

4. The method of claim 1, wherein the encoded bitstream further comprises a group skip flag indicating that all of a plurality of samples of a sample group of a corresponding component of the block are zeros.

5. The method of claim 2, further comprising:
   decoding, by the decoder circuit, each of the one or more sample groups using a common prefix entropy code (CPEC) to generate one or more decoded sample groups, each of the one or more sample groups comprising a variable length prefix and one or more fixed length suffixes representing a plurality of samples; and
   concatenating, by the decoder circuit, the decoded single samples and the decoded sample groups into a block of residuals.

6. The method of claim 2, wherein a number of the one or more single samples and a number of the one or more sample groups divided by the decoder circuit is set according to a target decoder throughput by:
   calculating an upper bound of the number of the one or more sample groups based on a number of samples of the block and a highest available throughput;
   calculating a number of variable length codes based on the number of samples of the block and the target decoder throughout; and
   calculating the number of the one or more singe samples based on the number of variable length codes and the upper bound of M.

7. The method of claim 2, wherein each of at least two of the one or more sample groups of the block has the same number of fixed length suffixes.

8. The method of claim 2, wherein at least one of the one or more sample groups of the block has a different number of fixed length suffixes than those of others from among the one or more sample groups.

9. The method of claim 5, wherein the reconstructing of the image content is further based on the block of residuals.

10. A system for decoding image content from an encoded bitstream comprising a plurality of blocks, the system comprising:
    one or more processors; and
    memory comprising instructions that when executed, cause the one or more processors to:
    divide a block comprising one or more components of the image content into one or more single samples corresponding to one of the one or more components by taking the one or more single samples from the block;
    decode each of the one or more single samples using a symbol variable length code (SVLC) to generate one or more decoded single samples, each sample of the one or more single samples being entirely coded as a separate variable length binary word; and
    reconstruct image content based on previously reconstructed neighboring blocks of the image content and the decoded single samples.

11. The system of claim 10, wherein to divide the block, the instructions further cause the one or more processors to group remaining samples of the block into one or more sample groups.

12. The system of claim 10, wherein the encoded bitstream further comprises a component skip flag indicating that all of a plurality of samples of a corresponding component of the block of the encoded stream are zeroes.

13. The system of claim 10, wherein the encoded bitstream further comprises a group skip flag indicating that all of a plurality of samples of a sample group of a corresponding component of the block are zeros.

14. The system of claim 11, wherein the instructions further cause the one or more processors to:
   decode each of the one or more sample groups using a common prefix entropy code (CPEC) to generate one or more decoded sample groups, each of the one or more sample groups comprising a variable length prefix and one or more fixed length suffixes representing a plurality of samples; and
   concatenate the decoded single samples and the decoded sample groups into a block of residuals.

15. The system of claim 11, wherein each of the one or more sample groups of the block has the same number of fixed length suffixes.

16. The system of claim 11, wherein at least one of the one or more sample groups of the block has a different number of fixed length suffixes than those of others from among the one or more sample groups.

17. The system of claim 14, wherein the reconstructing of the image content is further based on the block of residuals.

18. A decoding circuit for decoding image content from an encoded bitstream comprising a plurality of blocks, the decoding circuit configured to:
   divide a block comprising one or more components of the image content into one or more single samples corresponding to one of the one or more components by taking the one or more single samples from the block;
   decode each of the one or more single samples using a symbol variable length code (SVLC) to generate one or more decoded single samples, each sample of the one or more single samples being entirely coded as a separate variable length binary word; and
   reconstruct image content based on previously reconstructed neighboring blocks of the image content and the decoded single samples.

19. The decoding circuit of claim 18, wherein to divide the block, the decoding circuit is further configured to:
   group remaining samples of the block into one or more sample groups; and
   decode each of the one or more sample groups using a common prefix entropy code (CPEC) to generate one or more decoded sample groups, each of the one or more sample groups comprising a variable length prefix and one or more fixed length suffixes representing a plurality of samples.

20. The decoding circuit of claim 19, further configured to concatenate the decoded single samples and the decoded sample groups into a block of residuals,
   wherein the reconstructing of the image content is further based on the block of residuals.

* * * * *